(12) United States Patent
Barros et al.

(10) Patent No.: US 8,914,789 B2
(45) Date of Patent: Dec. 16, 2014

(54) SYSTEMATIC MIGRATION OF WORKLOAD BASED ON CLASSIFICATION

(75) Inventors: James Barros, Research Triangle Park, NC (US); Kamal Bhattacharya, New Delhi (IN); Brian L. Peterson, Somers, NY (US); Birgit Pfitzmann, Valhalla, NY (US); John Rofrano, Mahopac, NY (US); Kunwadee Sripanidkulchai, Hawthorne, NY (US); Christopher Ward, Hawthorne, NY (US)

(73) Assignee: International Business Machines Corporation, Armonk`, NY (US)

( * ) Notice: Subject to any disclaimer, the term of this patent is extended or adjusted under 35 U.S.C. 154(b) by 632 days.

(21) Appl. No.: 13/176,441

(22) Filed: Jul. 5, 2011

(65) Prior Publication Data

US 2012/0131567 A1    May 24, 2012

Related U.S. Application Data

(60) Provisional application No. 61/416,366, filed on Nov. 23, 2010.

(51) Int. Cl.
*G06F 9/44* (2006.01)
*G06F 9/50* (2006.01)

(52) U.S. Cl.
CPC .................................. *G06F 9/5088* (2013.01)
USPC ........................................ 717/172; 717/103

(58) Field of Classification Search
CPC ............ G06F 9/44; G06F 9/50; G06F 9/5088
USPC ................... 717/101–103, 168–173
See application file for complete search history.

(56) References Cited

U.S. PATENT DOCUMENTS

| | | |
|---|---|---|
| 2010/0293168 A1 | 11/2010 | Gupta |
| 2010/0318608 A1 | 12/2010 | Huang |
| 2011/0107327 A1 | 5/2011 | Barkie |
| 2011/0270968 A1* | 11/2011 | Salsburg et al. .............. 709/224 |

OTHER PUBLICATIONS

Deng et al., "Toward Middleware-based Online Application Migration", 2009, IEEE, pp. 222-227.*
William Witman, "Oracle Fusion Middleware Autonomy Search Integration Sample Guide for Oracle WebLogic Portal", Feb. 2010, Oracle Corporation, 72 pages.*
P.Mell & T. Grance. "The NIST Definition of Cloud Computing" Version 15, Oct. 7, 2009.
"Oracle Exalogic Architecture Service". Oracle, 2010.
"PlateSpin® Migrate" downloaded from http://wwvv.novell.com/products/migrate/ on Mar. 15, 2011.

(Continued)

*Primary Examiner* — Ted T Vo
(74) *Attorney, Agent, or Firm* — Louis J. Percello; Otterstedt, Ellenbogen & Kammer, LLP

(57) ABSTRACT

Data characterizing a source computing environment having at least one hardware resource and at least one workload is obtained, as is a specification of a target computing environment to which the at least one workload is to be migrated in a migration. Based on the data characterizing the source computing environment and the specification of the target computing environment, the migration is categorized into one of a plurality of categories; and the migration is specified in accordance with a migration technique selected based on the categorizing step. Techniques to identify suitable migration candidates are also provided.

10 Claims, 30 Drawing Sheets

(56) References Cited

OTHER PUBLICATIONS

SLPK, downloaded http://h21007.www2.hp.com/portal/site/dspp/menuitem.863c3e4cbcdc3f3515b49c108973a801/?ciid=0508edaa22f02110edaa22f02110275d6e10RCRD on Mar. 15, 2011.

"Migration of Data with LSMW" downloaded Mar. 15, 2011 from http://help.sap.com/saphelp_nw04s/helpdata/en/87/f3ae74e68111d1b3ff006094b944c8/content.htm.

"Documentation for Bluehorse" downloaded May 5, 2011 from http://publib.boulder.ibm.com/infocenter/tivihelp/v45r1/index.jsp?topic=/com.ibm.tivoli.tpm.apk.doc/Bluehorse_package.html.

* cited by examiner

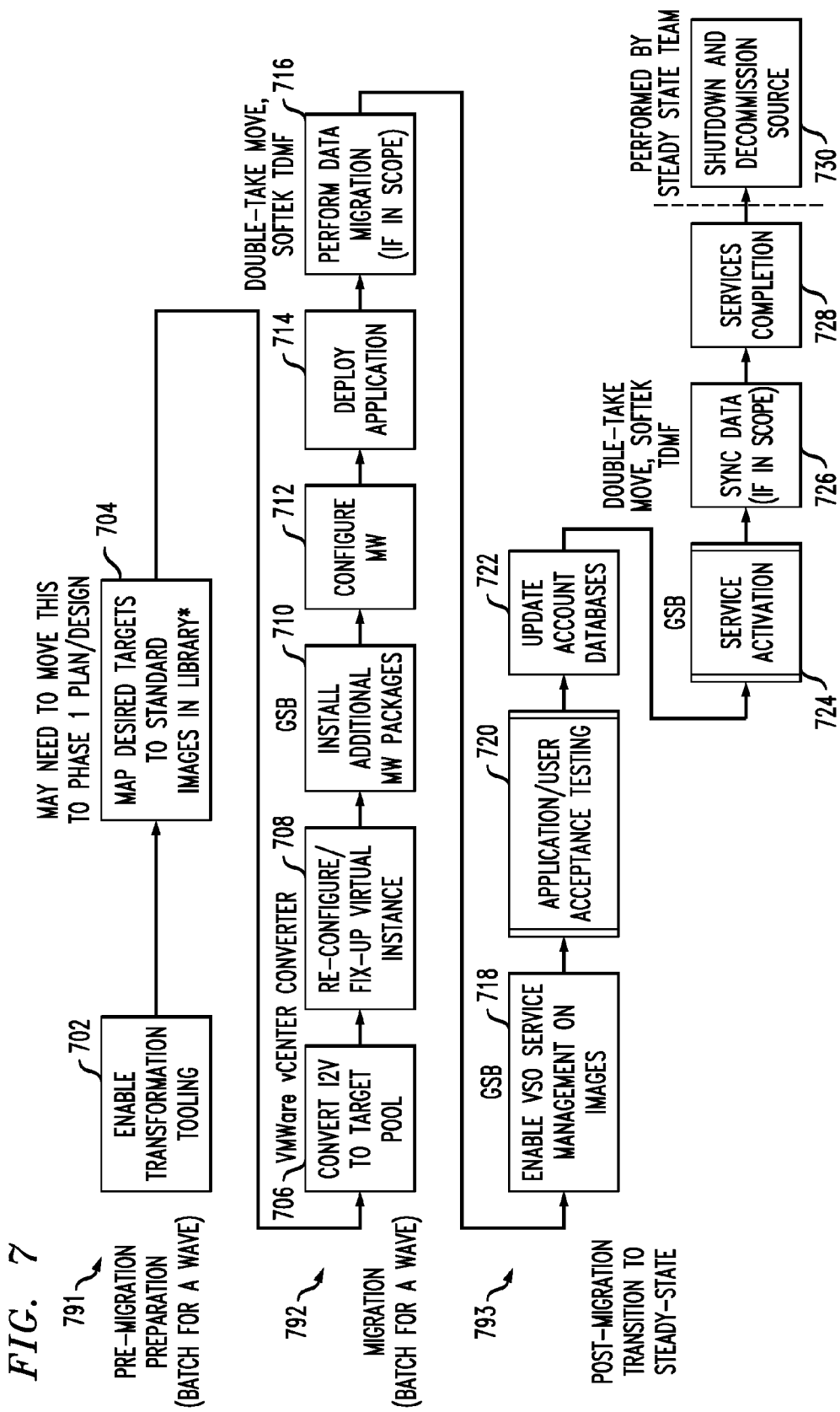

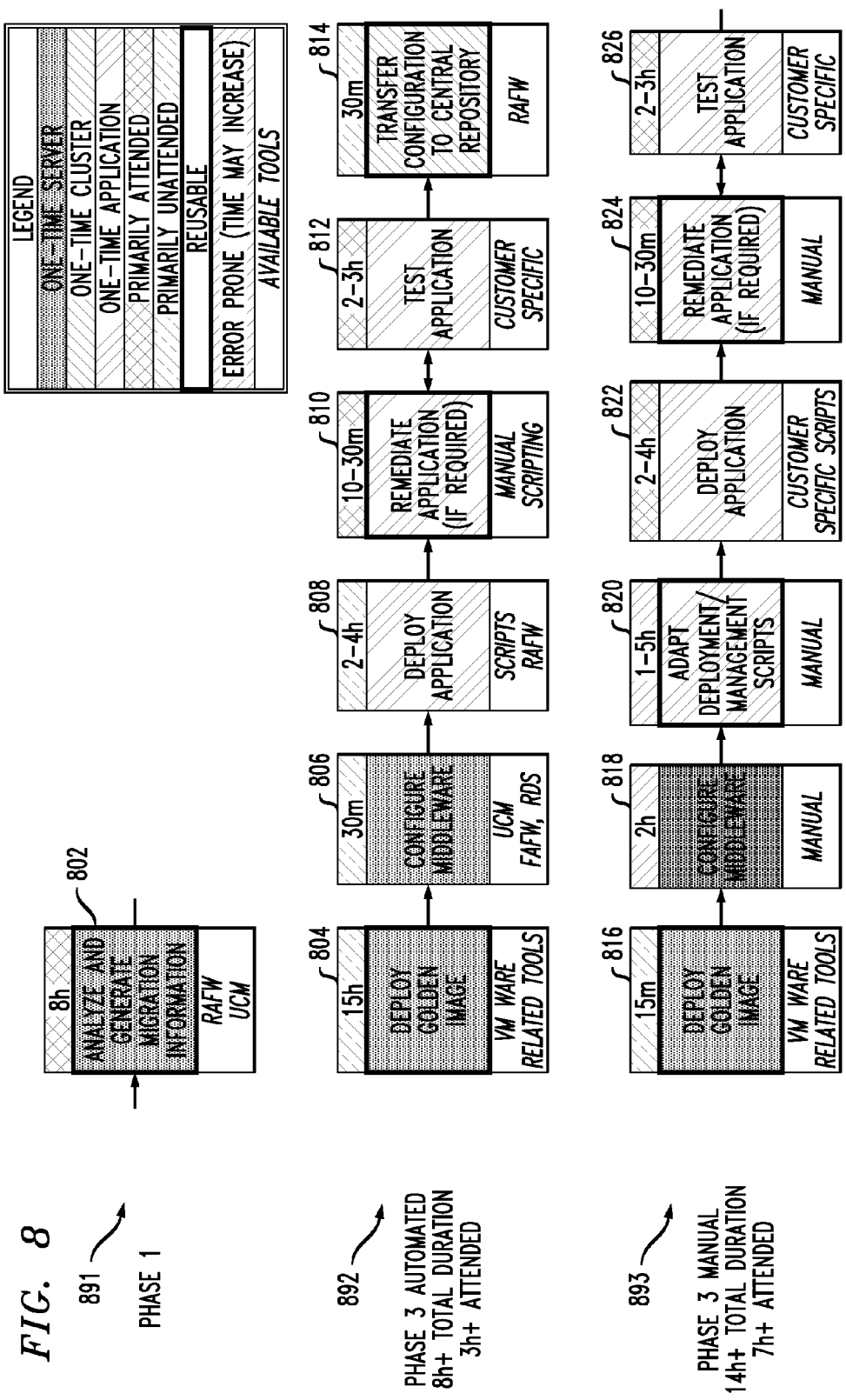

FIG. 9

| SCENARIO | MIGRATION STRATEGY | OS UPGRADE | MW UPGRADE | APPLICATION UPGRADE | OS/MW POST-CONFIGURATION | VSO SS TOOLS POST-CONFIGURATION |
|---|---|---|---|---|---|---|
| S1 (LIVE VIRTUALIZATION AND MIGRATION) | "CLASSICAL" P2V, MIGRATE OVER TO TARGET AND CUT-OVER INSTANTANEOUSLY POST-MIGRATION | NO | NO | NO | NO | YES |
| S2 (MIGRATION OF STAND-ALONE APPS) | STAND-ALONE APP HOSTED ON SINGLE MACHINE ON SOURCE IS MIGRATED INTO A VIRTUALIZED ENV ON TARGET | NO | NO | NO | YES (IP, HOSTNAME, FILESYSTEM) | YES |
| S3 (DISTRIBUTED APPS) | DISTRIBUTED APP HOSTED ON MULTIPLE MACHINES ON SOURCE IS MIGRATED INTO A VIRTUALIZED ENV ON TARGET | NO | NO | NO | NO | YES |
| S4 | LIKE S3 BUT MW UPGRADE. VIRTUALIZE INTO TARGET ENV AND RUN MW UPGRADES POST-MIGRATION. | NO | YES | YES/NO (DEPENDING ON MW VERSION) | YES APPLICATION SPECIFIC RE-CONFIGURATION (DATA SOURCES, QUEUES, etc.) | YES |
| S5 | LIKE S2 BUT REQUIRES APPLICATION UPGRADE. MIGRATE AND UPGRADE INSTALLATION POST-MIGRATION | NO | NO | YES | NO | YES |
| S6 | LIKE S1, S2, S3 BUT WITH OS/MW VERSION UPGRADE. REBUILD SYSTEM ON VIRTUALIZED TARGET ENVIRONMENT ON NEW OS/MW VERSION | YES | YES/NO | YES/NO | YES (EVERYTHING NEEDS TO BE RECONFIGURED AFTER REBUILDING ON TARGET) | YES |

FIG. 19

```
              CHANGE DB2 HOSTNAME RELATIVE CONFIGURATION (WINDOWS)
1. Update Computer Name: System properties -> Computer Name ->
   Change -> Input new Computer name
2. Update following registry entries to correct value
Global Profile
   •   [HKEY_LOCAL_MACHINE\SOFTWARE\IBM\DB2\GLOBAL_PROFILE]
   •   "DB2_ADMINGROUP"="your_new_comp_name\your_admin_group_name"
   •   "DB2_USERSGROUP"="your_new_comp_name\your_user_group_name"
   •   "DB2SYSTEM"="your_new_comp_name"

•   [HKEY_LOCAL_MACHINE\SOFTWARE\IBM\DB2\PROFILES\DB2]
   •   "DB2INSTOWNER"="your_new_comp_name"
   •   "DB2ACCOUNTNAME"="your_new_comp_name\your_inst_name"
Installed Copies Profile
   •   [HKEY_LOCAL_MACHINE\SOFTWARE\IBM\DB2\InstalledCopies\
       <your_db2_copy_name>\GLOBAL_PROFILE]
   •   "DB2_ADMINGROUP"="your_new_comp_name\your_admin_group_name"
   •   "DB2_USERSGROUP"="your_new_comp_name\your_user_group_name"
   •   "DB2SYSTEM"="your_new_comp_name"

•   [HKEY_LOCAL_MACHINE\SOFTWARE\IBM\DB2\InstalledCopies\
       <your_db2_copy_name>\PROFILES\DB2]
   •   "DB2INSTOWNER"="your_new_comp_name"
   •   "DB2ACCOUNTNAME"="your_new_comp_name\your_inst_name"
3. Fix db2nodes.cfg
   •   "C:\Documents and Settings\All Users\Application Data\IBM\DB2\
       <your_db2_copy_name>\DB2\db2nodes.cfg"
4. Reboot the window server and take effect the changes
5. Use the db2set -all command to examine the current registry variables,
       If they're not correct, Issue following commands to correct it.
   •   db2set DB2ACCOUNTNAME="your_new_comp_name\your_inst_name"
   •   db2set DB2INSTOWNER="your_new_comp_name"
   •   db2set -g DB2SYSTEM="your_new_comp_name"
```

FIG. 20

RUN PRE-REQUIREMENT CHECK (WINDOWS)
- 1.OS, Runtime Lib and database pre-requirement
    <u>Command:</u>    db2prereqcheck.exe
- 2. File system Space check (Backup & Code)
    1.5GB to store DB2 code
    C:\ at least 40MB free space
    Temp dir at lease 60MB free space
- 3. User permission check
    Ensure the id has Local Administrator authorization on Windows operating systems.

BACKUP DB2 ENVIRONMENT
- 1.Backup DBM & DB CFG
    <u>Command:</u>    db2 GET DBM CFG > *your_backup_file*
                       db2 GET DB CFG FOR *your_db_name* > *your_backup_file*
- 2.Backup Registry Variants
    <u>Command:</u>    db2set -all > *your_backup_file*
- 3.Backup Database Structures
    <u>Command:</u>    db2look -d *your_db_name* -e -o *your_backup_file* -l -x -f
                       db2 "select * from syscat.bufferpools" > *your_backup_file*
- 4.Backup Catalog Info
    <u>Command:</u>    db2cfexp *your_backup_file* backup
- 5.Backup Other Info
    <u>Command:</u>    db2licm -l > *your_backup_file*

BACKUP DATABASE
- 1.Backup database to local filesystem (Offline Backup)
    <u>Command:</u>    db2 backup db *your_db_name* to *your_dir_to_store_backup*
- 2.Backup database to TSM server directly (Offline Backup)
    <u>Command:</u>    db2 backup db *your_db_name* use tsm

RESTORE DATABASE
- 1.Restore database from local filesystem (Offline Backup)
    <u>Command</u>    db2 restore db *your_db_name* from
                       *your_dir_store_backup* taken at *backup_timestamp*
- 2.Restore database from TSM server directly (Offline Backup)
    <u>Command:</u>    db2 restore db *your_db_name* use tsm options
                       " '-fromnode=*node_name*-fromowner=*owner_name*' "

FIG. 21

UPDATE DB2 ENVIRONMENT
- 1. Update DBM & DB CFG
  - Command: db2 update dbm cfg using *dbm_cfg_parameter_name*
    *dbm_cfg_parameter_value*
    db2 connect to *your_db_name*
    db2 update db cfg using *db_cfg_parameter_name*
    *db_cfg_parameter_value*
  - Eg. To update db2 listening port (service port)
    db2 update dbm cfg using SVCENAME *new_port_num*
- 2. Update registry variants
  - Command: db2set *reg_var_name=reg_var_value*
- 3. Catalog/Re-catalog Databases Info

VERIFY DB2 VERSION & APPLY LICENSE
- 1. Verify DB2 Version
  - Command: db2level
- 2. Apply License
  - Command: db2licm -a *your_license_file*

REBIND DB2 PACKAGES
- 1. Rebind CLP packages
  - Command: db2 connect to *your_db_name*
    cd ~/sqllib/bnd
    db2 "bind @db2ubind.lst blocking all grant public"
    db2 "bind db2schema.bnd blocking all grant public"
    db2 "bind @db2cli.lst blocking all grant public"
- 2. Rebinds packages in a database
  - Command: db2rbind *your_db_name* -l *your_log_file*

RUN SECURITY HEALTH CHECK
- Security Health Check tool : db2shc

RECREATE ROUTINES
- Recreate stored procedure which uses external lib written by Java/C/C++

*FIG. 22*

UPGRADE DB2 INSTANCE
- 1.Upgrade DB2 Instance (for V9.7)
    Command:    db2iupgrade -u *fenced_id instance_id*
- 2.Migrate DB2 Instance (for V9.1, V9.5)
    Command:    db2imigr -u *fenced_id instance_id*

MIGRATE DATABASE
- Migrate DB2 Database from previous versions
    Command:    db2 migrate database *your_db_name*

RELOCATE DATABASE
- Relocate database – This command renames a database, or relocates a database or part of a database (for example, the container and the log directory) as specified in the configuration file provided by the user.
    Command: db2relocatedb -f *configFilename*

The format of the configuration file is:
    DB_NAME=*oldName,newName*
    DB_PATH=*oldPath,newPath*
    INSTANCE=*oldInst,newInst*
    NODENUM=*nodeNumber*
    LOG_DIR=*oldDirPath,newDirPath*
    CONT_PATH=*oldContPath1,newContPath1*
    CONT_PATH=*oldContPath2,newContPath2*
    ... ...
    STORAGE_PATH=*oldStoragePath1,newStoragePath1*
    STORAGE_PATH=*oldStoragePath2,newStoragePath2*
    ... ...

Example:
    The database PRODDB exists in the instance inst1 on the path /databases/PRODDB. The location of two table space containers needs to be changed as follows:
        SMS container /data/SMS1 needs to be moved to
        /DATA/NewSMS1.
        DMS container /data/DMS1 needs to be moved to
        /DATA/DMS1.
    After the physical directories and files have been moved to the new locations, the following configuration file can be used with the db2relocatedb command to make changes to the database files so that they recognize the new locations:
        DB_NAME=PRODDB
        DB_PATH=/databases/PRODDB
        INSTANCE=inst1
        NODENUM=0
        CONT_PATH=/data/SMS1,/DATA/NewSMS1
        CONT_PATH=/data/DMS1,/DATA/DMS1

OPPORTUNITY IDENTIFICATIONS

US 8,914,789 B2

SYSTEMATIC MIGRATION OF WORKLOAD BASED ON CLASSIFICATION

CROSS-REFERENCE TO RELATED APPLICATIONS

This patent application claims the benefit of U.S. Provisional Patent Application Ser. No. 61/416,366 filed on Nov. 23, 2010, and entitled "METHOD AND APPARATUS FOR THE SYSTEMATIC MIGRATION OF WORKLOAD TO BASED ON S1-S6 CLASSIFICATION." The disclosure of the aforementioned Provisional Patent Application Ser. No. 61/416,366 is expressly incorporated herein by reference in its entirety for all purposes.

FIELD OF THE INVENTION

The present invention relates to the electrical, electronic and computer arts, and, more particularly, to information technology and the like.

BACKGROUND OF THE INVENTION

Presently, server migration is handled in a rather ad hoc fashion. Servers are initially discovered using a variety of discovery tools. Analysis is then applied to the server data to develop so-called placement and wave planning guides. The placement indicates where in the target environment the servers are to be migrated to, while the wave planning indicates in which order the servers are to be migrated. Typically, wave planning is based on the resources available to carry out the migration, the change windows, and so on. The migrations are then effectuated using a variety of tools and technologies.

SUMMARY OF THE INVENTION

Principles of the invention provide techniques for systematic migration of workload based on classification. In one aspect, an exemplary method includes the steps of obtaining data characterizing a source computing environment having at least one hardware resource and at least one workload; obtaining a specification of a target computing environment to which the at least one workload is to be migrated in a migration; based on the data characterizing the source computing environment and the specification of the target computing environment, categorizing the migration into one of a plurality of categories; and specifying the migration in accordance with a migration technique selected based on the categorizing step.

In another aspect, another exemplary method includes the steps of obtaining configuration data indicative of a plurality of potential source computing environments appropriate for migration; obtaining application assessment data; selecting search criteria; displaying results based on at least the application assessment data and searching with the search criteria; obtaining a selection of at least one of the potential source computing environments as indeed being appropriate for the migration; and storing the selection in a target list.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code (stored therein in a non-transitory manner) for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

reduced risk of migration failure due to automated selection of approach and methodology increased speed based upon automatic selection of appropriate approach more repeatable results lower skill set requirements because need for subject matter experts is reduced or eliminated more efficient use of available computer assets These and other features and advantages of the present invention will become apparent from the following detailed description of illustrative embodiments thereof, which is to be read in connection with the accompanying drawings.

BRIEF DESCRIPTION OF THE DRAWINGS

FIG. 7 shows a flow chart of exemplary method steps for carrying out migration phase 3 for type S6 migration of exemplary application server software, according to an aspect of the invention;

FIG. 8 shows a flow chart of exemplary method steps for carrying out a new build of an application server using approach S6;

FIG. 9 shows at least a portion of the logic of FIG. 1 in tabular form, according to an aspect of the invention;

FIGS. 19-22 show an exemplary sequence of steps for database system upgrade and database migration, according to an aspect of the invention;

DETAILED DESCRIPTION OF PREFERRED EMBODIMENTS

Figure 1:
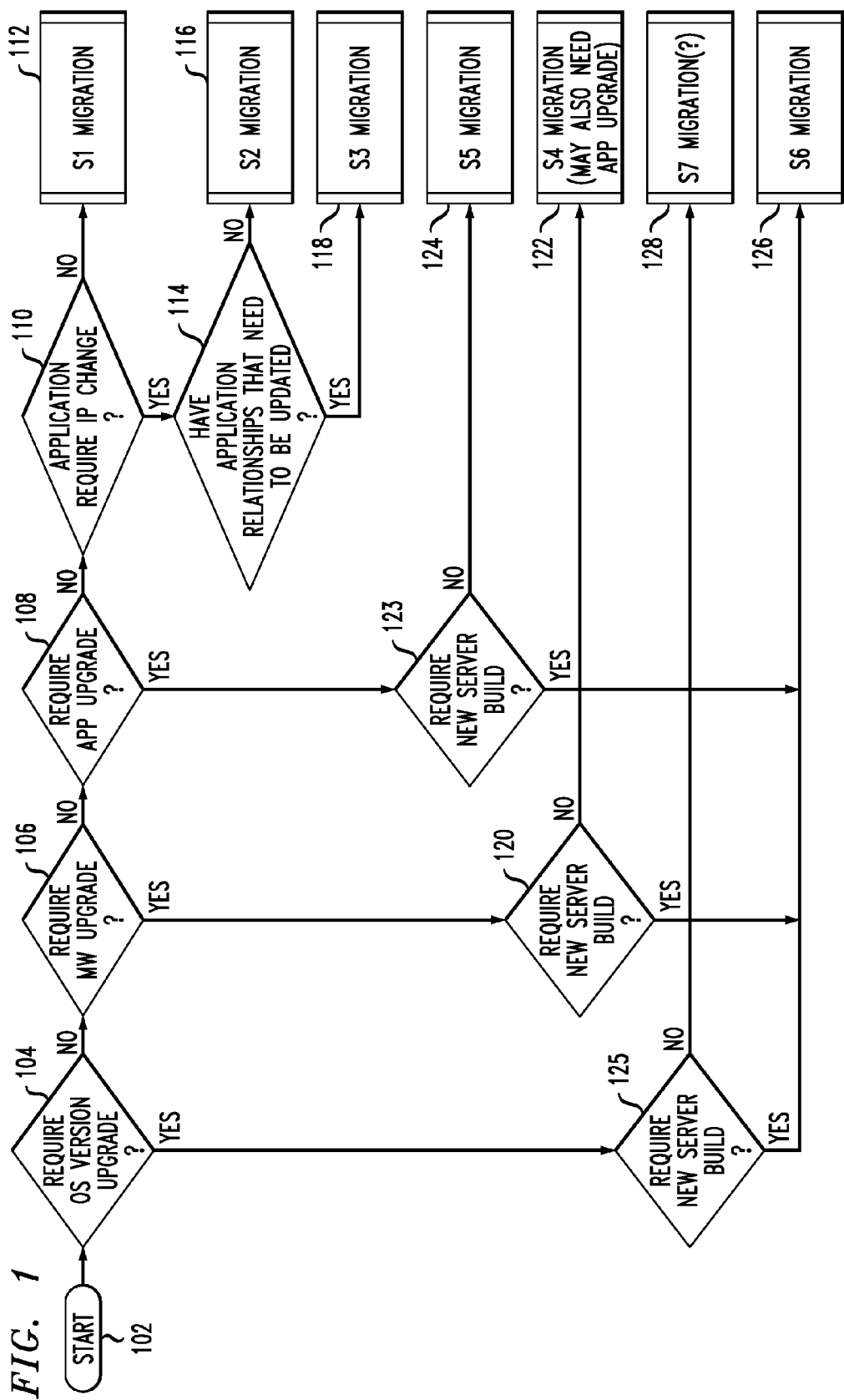
FIG. 1 shows a flow chart of exemplary method steps for characterizing migration, according to an aspect of the invention.

One or more embodiments provide techniques to migrate workload based on a classification. Some instances are directed towards providing a virtualized service, with both a migration aspect and a steady state aspect. Some embodiments provide techniques to select accounts that are good candidates for migration; in at least some instances, the criteria for a good candidate is that migrations fit characteristics that allow them to migrate inexpensively. A non-limiting example of such cases includes the WINDOWS® (registered mark of Microsoft Corporation, Redmond, Wash., USA)/X86 environment, with simple workloads in accordance with criteria defined herein.

As will be discussed in greater detail below in connection with FIGS. 1 and 9, one or more embodiments employ a classification (S1-S6) which recognizes that there are different techniques that can be applied for different workloads. For example, image migration can be applied for an S1 use case, where there are not IP or hostname changes or the like. S2 uses image migration but requests some fix-up of the applications after they have been migrated, and the like. S3 requires migration of an application that includes multiple servers; these servers have application dependencies between them. As such, it is appropriate to fully understand the characterization of the workload, and then ensure that some approach is taken to ensure correct operation after migration.

One approach for S1 and/or S2 is disclosed in co-assigned US Patent Publication 2010-0318608, Dec. 16, 2010, of Kunwadee Sripanidkulchai et al., entitled "SYSTEMS AND METHODS FOR EFFICIENT LIVE APPLICATION MIGRATION WITHIN BANDWIDTH CONSTRAINED NETWORKS," which uses VPN and/or NAT technology; the complete disclosure of same is expressly incorporated herein by reference in its entirety for all purposes. Also expressly incorporated herein by reference in its entirety for all purposes is co-assigned US Patent Publication 2010-0293168, Nov. 18, 2010, of Manish Gupta et al., entitled "DETERMINING CONFIGURATION PARAMETER DEPENDENCIES VIA ANALYSIS OF CONFIGURATION DATA FROM MULTI-TIERED ENTERPRISE APPLICATIONS"; this reference supplements the approach adopted for S1/S2 that accommodates application dependency corrections as referenced in S3. S4-S6 involve middleware updates, application updates and operating system (OS) updates respectively. One or more embodiments perform systematic updates to the middleware (application/OS) packages on the target system after the migration has taken place. One or more exemplary methods begin with a systematic process for handling migrations into virtualized environments. The initial pre-screening for accounts selects good candidate(s) using analytics provided from, for example, a global asset configuration warehouse, and questionnaire data provided by subject matter experts (SMEs).

One or more embodiments provide decision logic for classifying which method to use to migrate workload. One characteristic of one or more embodiments is that models for installation of selected middleware packages are used. These process models are then composed (e.g., installation of an application server such as IBM WEBSPHERE® APPLICATION SERVER (WAS) followed by a database such as IBM DB2® (registered marks of International Business machines Corporation, Armonk, N.Y., USA)) in accordance with the overall server build process. Typical models are developed for middleware packages such as WAS, DB2, MQ (IBM Message Queuing System), and the like. A non-limiting example of these concepts for WAS is provided hereinbelow.

One significant aspect of one or more embodiments is that it is possible to tie a characterization of a workload migration to an approach which is then used to effectuate that migration. A migration is, in essence, where it is desired to migrate workloads (applications) from one environment to another environment—in general, there may be few or many changes involved. In one or more embodiments, by a careful analysis of the source environment (source), along with a characterization of the changes that must take place in order to render the solution on the target, a number of different approaches can be adopted for actually effectuating the migration itself. An analysis of the source configuration, coupled with a specification of what is going to change (which specification may be at several levels of granularity), is actually sufficient to select the approach that is going to be used, and then to actually execute the changes.

One embodiment of an appropriate classification is seen in FIG. 1. What is seen therein is a classification hierarchy or taxonomy which results in a number of different scenarios on the right-hand side, namely, the S1 through S7 migrations numbered, respectively, 112, 116, 118, 122, 124, 126, 128. Note that categories such as S1 through S6 or S1 through S7 are exemplary and non-limiting. Other embodiments could use more, fewer, and/or different categories. After beginning in start step 102, determine in decision block 104 whether an operating system (OS) version upgrade is required. If not, determine in decision block 106 whether a middleware (MW) upgrade is required. If not, determine in decision block 108 whether an application (app) upgrade is required. If not, determine in decision block 110 whether an interne protocol (IP) address change is required. If not, category S1 migration is appropriate, as per 112.

In essence, FIG. 1 illustrates a non-limiting exemplary manner in which the nature of the changes involved in effectuating the workload migration can be characterized in a systematic manner. In the simplest kind of migration (S1, as per block 112), very little change is required; for example, an image of the server on which the workload is running may simply be copied and placed somewhere else where it will start it up and run without any problems. This is known as image migration. Existing technologies are capable of carrying out image migration. However, when changes are required, things become more complicated. "Low-hanging fruit," i.e., relatively uncomplicated changes, include changes to the host name and IP address of a server. In such cases, the application may be moving to a different subnet, and thus will have a different IP address.

When the IP and host names change but nothing else changes, the migration may be characterized, in the exemplary embodiment, as an S2 migration, as seen at decision block 114 (NO branch) and block 116. Some workloads (applications) have application dependencies. Application dependencies (the other applications and databases that a particular application needs to interact with to function properly) per se, and their discovery, are well-known to the skilled artisan (e.g., IBM's Tivoli Application Dependency Discovery Manager TADDM). An example of this type of scenario is a business application which has a database on a separate server. Database connection information may be, for example, a configuration element in the application. When the application is moved to a different host name and IP address, it will be necessary to go in and change the configuration information for the database connector. This can occur when the application includes different communicating components which need to know about each other and/or when the application needs to communicate with external applications which need to know about the application in question. In such instances, the migration may be characterized, in the exemplary embodiment, as an S3 migration, as seen at decision block 114 (YES branch) and block 118.

To summarize, S1 corresponds to no changes, S2 corresponds to a host name and IP address change only; and S3 corresponds to a case where there are configuration changes due to application dependencies, but that is all (i.e., not a new version of the software (SW) or a change in the platform).

Where more changes are required, consider the three layers of SW: OS, MW, and application. In the more transformative cases, consider situations where the OS, MW, or application are changing. S4, at 122, represents a MW change, as per the YES branch of decision block 106, as well as a NO in decision block 120, i.e., new server build not needed. S5, at 124, represents a case wherein the application is changing, as per the YES branch of decision block 108, as well as a NO in decision block 123, i.e., new server build not needed. S6, at 126, represents a case wherein the OS is changing, as per the YES branch of decision block 104, as well as a YES in decision block 125, i.e., new server build is needed (if not needed, go to category S7, at 128, as per the NO branch of block 125). If the OS changes, the MW must typically also be re-installed, and changes to the application may also be required. In the exemplary scheme of FIG. 1, the migrations increase in complexity from S1 to S7.

Note that the YES branches of decision blocks 120 and 123 also result in an S6 categorization in the example of FIG. 1.

Systematic coupling between the discovered information of the source environment and a specification of the target environment is significant in one or more embodiments. By way of clarification, a characterization or specification of the target is appropriate in one or more embodiments. When seeking to carry out a migration, there is typically an objective in mind. For example, consider cross-platform migrations for the purpose of data center consolidations. In one aspect, the configuration prior to and subsequent to the change may be viewed as givens, and one or more embodiments determine what is changing and specify a systematic way of making the change. The specification of the source environment is typically quite detailed, whereas that of the target environment is more in the nature of a desired objective and there may be fewer configuration details as compared to the source environment. Thus, the target environment may be specified in the nature of an objective (or objectives) that it is desired to obtain. For example, consider a business application such as a strategy management system to be moved from an existing configuration to a target. All the configuration of the source is already there, and deep discovery may be carried out to identify dependencies or the like. The target objective may be, for example, to run on a certain kind of system under a certain kind of operating system (for example, with a new IP address and a new host name). Based on the source specification and characterization of the target objectives, one or more embodiments provide a systematic methodology and technical approach to accomplish the migration from the source to the target. At present, this is typically carried out by hand by skilled practitioners. One or more embodiments provide a deep structural mapping between the target objectives and the approach used to accomplish the migration. FIG. 1 thus represents an embodiment of high-level decision logic that provides the aforementioned characterization. A more detailed, lower-level logic is presented in the section immediately below entitled "Expression of a Migration Method in Rules."

Expression of a Migration Method in Rules

Figure 26:
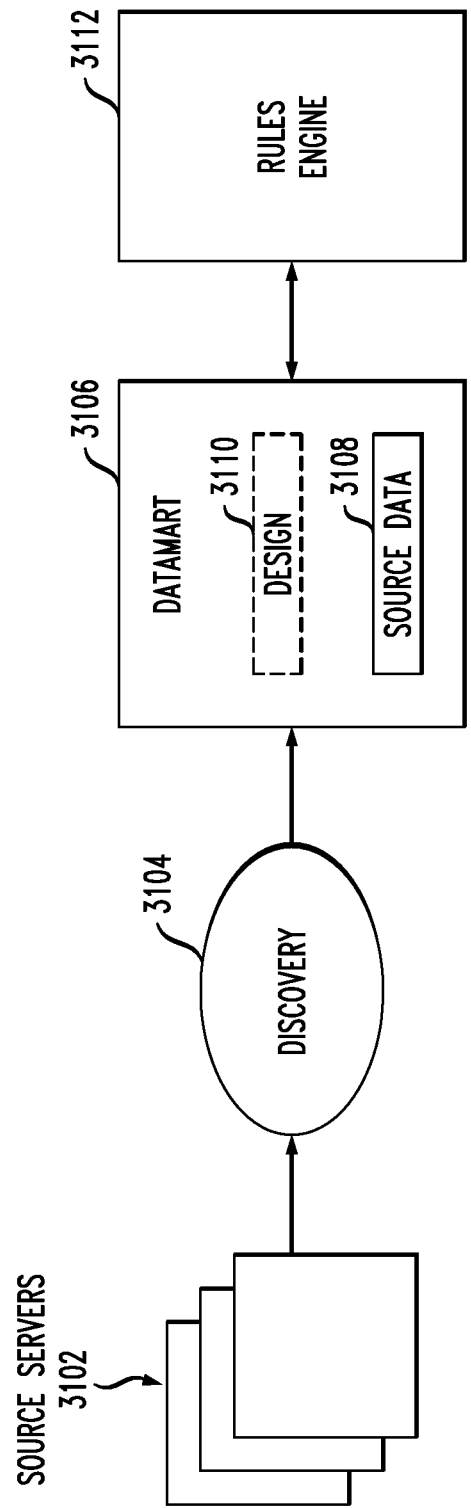
FIG. 26 shows a high-level block diagram, according to an aspect of the invention.
Figure 27:
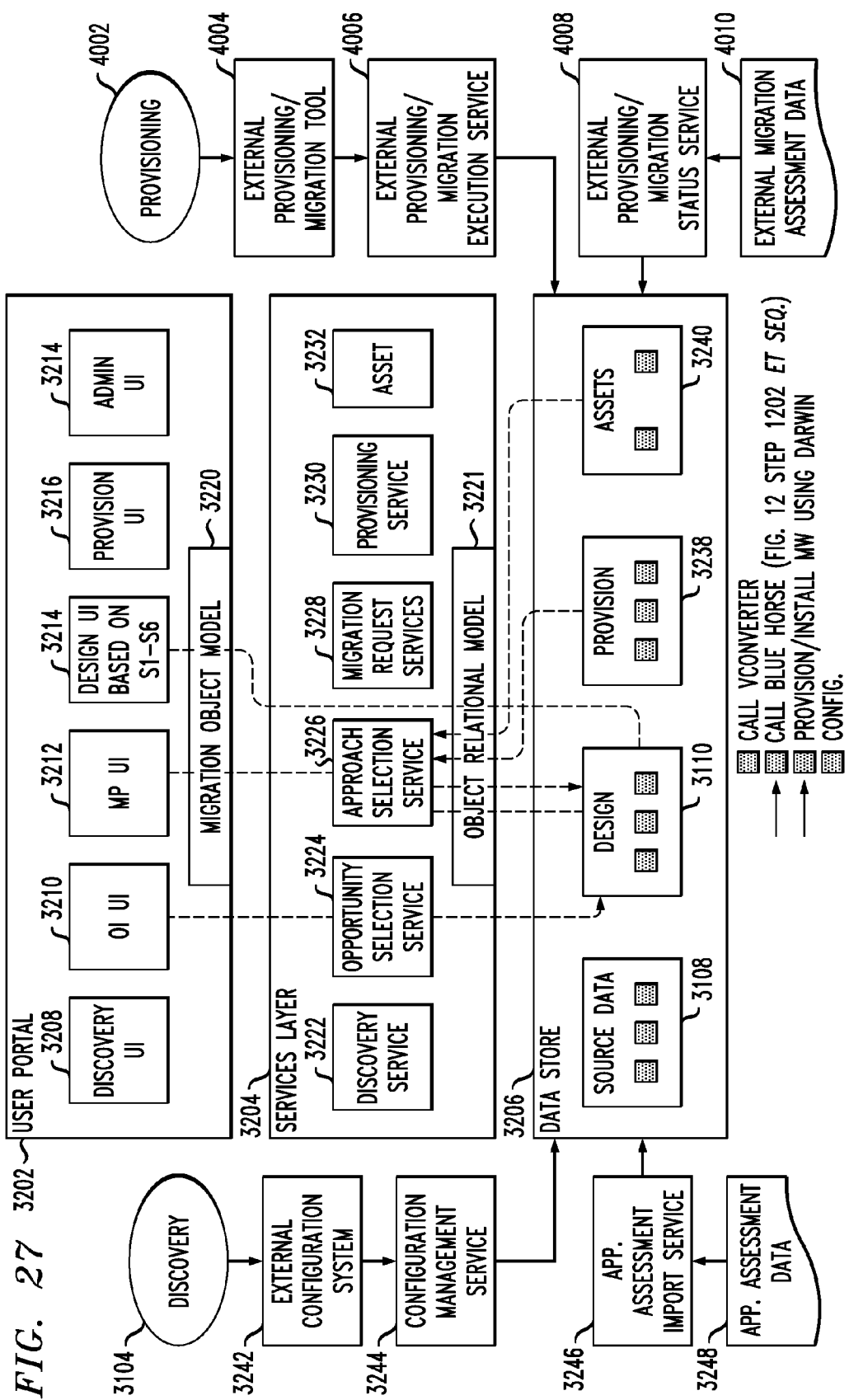
FIG. 27 shows a detailed block diagram, according to an aspect of the invention.

Refer now to FIGS. 26 and 27. This section provides a non-limiting example wherein every rule has metadata and an extensible markup language (XML) schema in the datamart 3106 (data about the source system (e.g., source servers 3102) obtained through the discovery process 3104 and possibly some additional data). Note, e.g., source data 3108 and design 3110; note also rules engine 3112. Furthermore, the non-limiting example is provided for a case of migration from physical servers to virtual servers, and so it is assumed that source servers are all physical. Other embodiments could use different approaches or be applied in different cases, such as physical-to-physical, virtual-to-virtual, or virtual-to-physical.

FIG. 27 presents a more detailed architecture. In general, user portal 3202 includes a plurality of user interfaces which interact with corresponding services in the services layer 3204 to access data in the data store 3206. User portal 3202 includes discovery, opportunity identification, migration plan, design, provision, and admin user interfaces (UIs) 3208, 3210, 3212, 3214, 3216, and 3218, respectively. Discovery UI 3208 allows access to discovery tool 3104 to discover the data with regard to the external configuration system 3242; configuration management service 3244 is used to enter the discovered data into the data store 3206 (the latter being analogous to datamart 3106). Note that element 3104 is a tool that that is created to perform discovery on an environment with a broad set of possible applications. The discovery service of 3222 is a service layer that interacts with (possibly) many discovery tools 3014 and requests from them data that is used to populate the data repositories used for migrations. This can be accomplished either by data copying (as is used in Scope database) or data federation.

Note also services layer 3204 with the corresponding services including discovery service 3222, opportunity selection service 3224, approach selection service 3226, migration request service 3228, provisioning service 3230, and asset 3232. Approach selection service 3226 is analogous to the rules engine 3112. In some instances, design data 3110 is used to configure the approach selection service 3226 which interacts with the migration plan user interface 3212.

In addition to source data 3108 and design data 3110, data store 3206 can also include, for example, provision data 3238 and assets 3240. Furthermore, in addition to data supplied by way of 3104, 3242, 3244, application assessment (e.g., questionnaire) data 3248 can be imported into data store 3206 via application assessment import service 3246. See also block 416 in FIG. 4.

Thus, in one or more embodiments, opportunity identification user interface 3210 interacts with opportunity selection service 3224 to examine design data 3110 and identify fruitful opportunities.

In one or more embodiments, the Portal experience of 3202 that is provided by elements 3208-3218 makes use of an exposed migration object model 3220. Likewise, the services layers of 3204 as provided by elements 3222 to 3232 makes use of exposed migration object relational model 3220.

The notations "CALL VCONVERTER," "CALL BLUE HORSE," "PROVISION/INSTALL MW (MIDDLEWARE) USING DARWIN," and "CONFIG." all refer to various provisioning options; in general, the provisioning options get configured based on the selected approach and their details get filled out by the design UI for that particular system.

Figure 28:
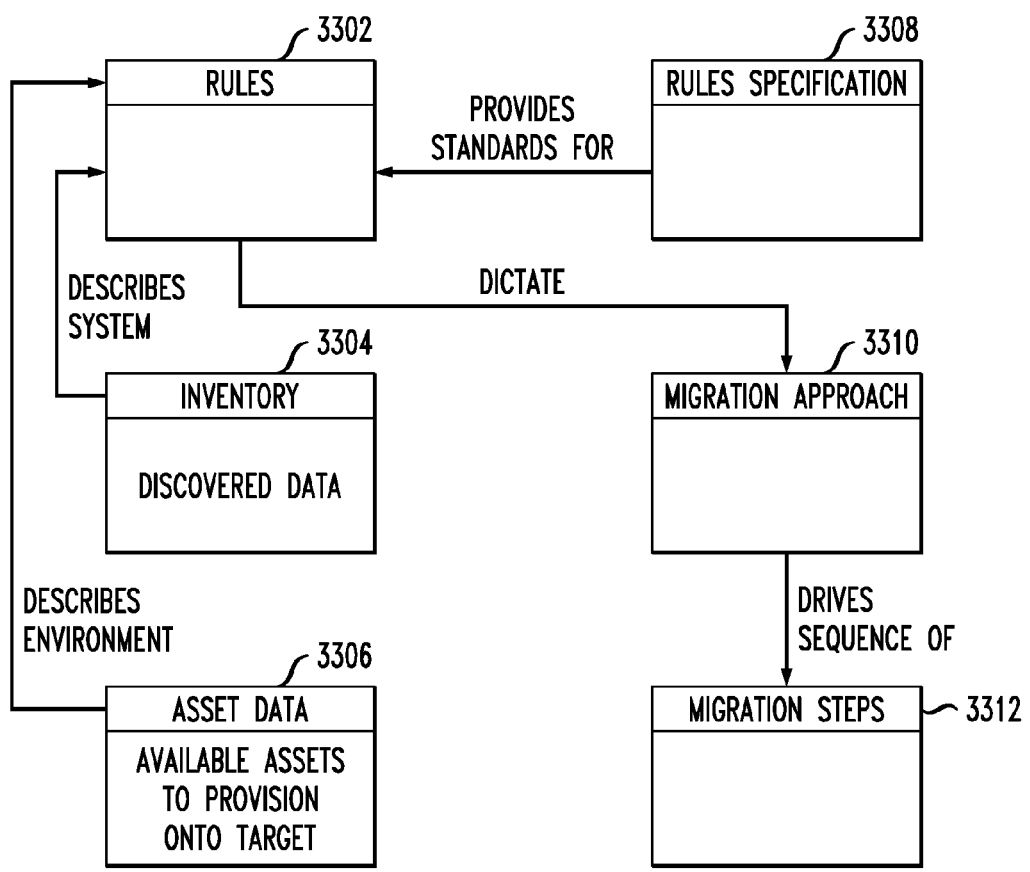
FIG. 28 shows an exemplary approach selection service, also known as a rules framework, according to an aspect of the invention.

Referring now to FIG. 28, consider the approach selection service 3226 which is essentially equivalent to a rules framework. The rule specification table 3308 provides standards for coded-up rules 3302. Inventory table 3304 includes the discovered data describing the source system. Asset data 3306 specifies the assets in the target environment that are available to be provisioned onto. The migration approach 3310 is dictated by the rules 3302, and drives a sequence of migration steps 3312. In some instances, each XML document is a rule 3302.

Figure 29:
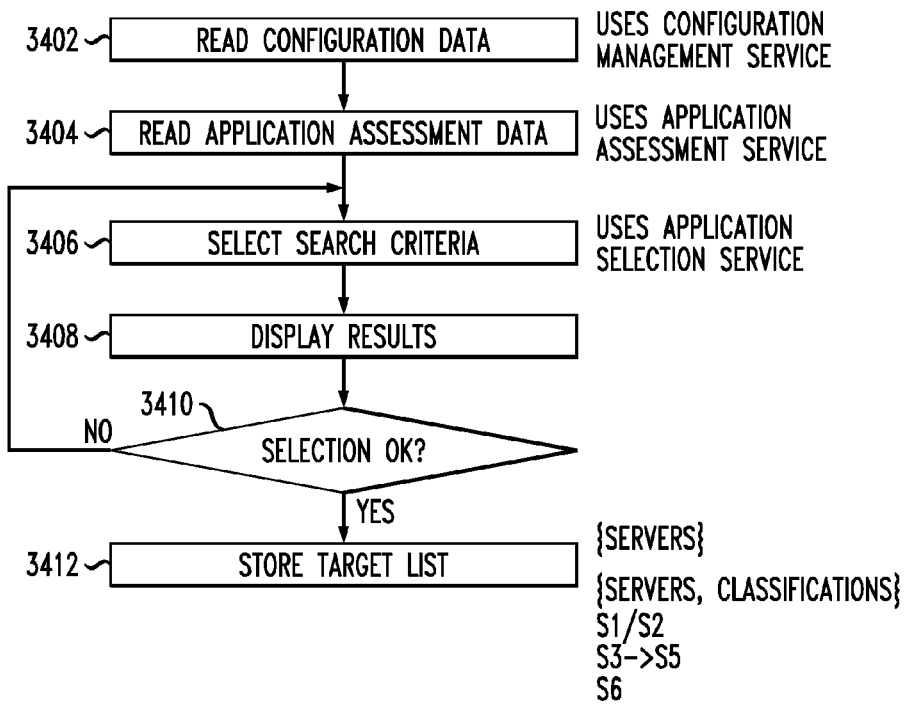
FIG. 29 is a flow chart of exemplary steps for opportunity identification, according to an aspect of the invention.

Consider now an exemplary opportunity identification process as in FIG. 29. This process may be carried out, for example, with the aid of opportunity identification UI 3210 and opportunity selection service 3224. In step 3402, read configuration data using, for example, the configuration management service 3244. In step 3404, read the application assessment data 3248 using the application assessment service 3246. In step 3406, select the search criteria using a suitable Application Approaches Selection Service. In one or more embodiments, the Approach Selection Service includes approaches for a business application, i.e., the approach applies not to an entire opportunity but rather to a set of servers that comprise an application. A business application, e.g. 'Expense Reimbursement' may have a collection of servers, some of which require little change (would be moved using S1/S2/S3) and some which require porting, e.g. the database was developed on Oracle on Solaris and the target is DB2 on system P, this would be handled using S6.

In step 3408, display the results using the UI 3210 and a suitable hardware display device. In step 3410, see if the results are satisfactory. If so, in step 3412, store a target list of servers that represent good opportunities for migration. Optionally, also store with them the corresponding categories (i.e., in buckets corresponding to S1-S6), e.g., those servers with migrations in category S1 or S2; those servers with migrations in categories S3->S5, and those servers with migrations in category S6. These results could be stored, for example, in the design 3110 portion of the data store 3206. Thus, in one or more embodiments, the output is a classified list, and the process of FIG. 29 represents an assessment of "low hanging fruit" across existing customers, based on the appropriate rules. If results in step 3410 are not satisfactory (say, not enough opportunities identified, or too many opportunities identified), go back to step 3406 and change the search criteria.

Figure 30:
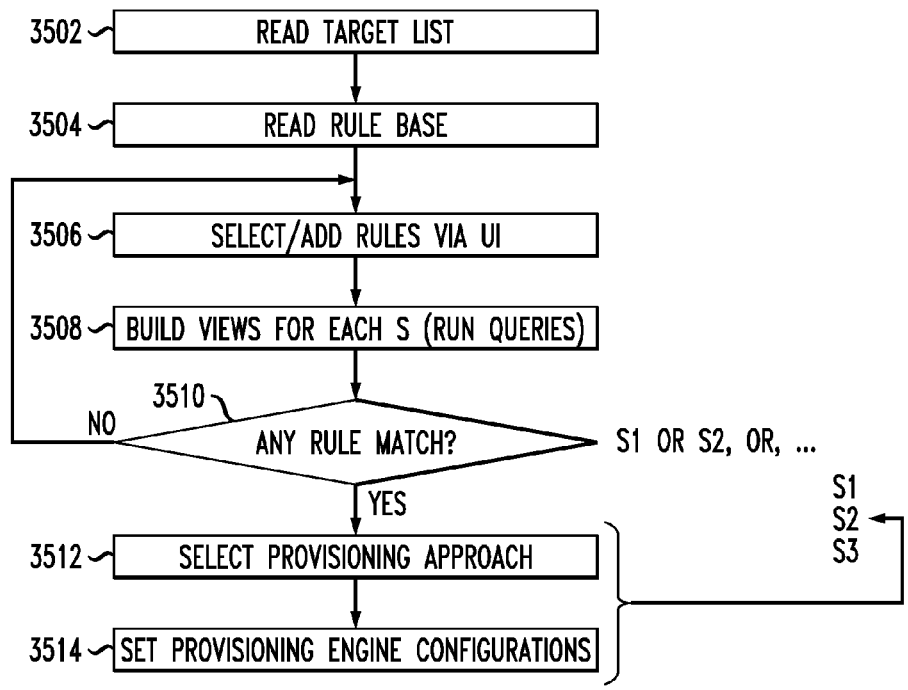
FIG. 30 is a flow chart of exemplary steps for migration planning, according to an aspect of the invention.

Consider now the migration planning UI 3212, wherein a precise focus on selection of the migration method to be applied takes place, with the aid of approach selection service 3226. Referring now to FIG. 30, in step 3502, read the target list which was stored in step 3412. In step 3504, read in the rule base 3308. In step 3506, select and/or add rules via UI 3212, resulting in rules 3302. In step 3508, build the views for each possible migration method by running appropriate queries, and in step 3510, determine if any of the rules match. In one or more embodiments, the results of the opportunity selection service (lists of accounts and servers collected together into business application groups) is reviewed for selection of good candidates for migration based on Return on Investment, leveraging standard cost models for the cost of migrating different server combinations. These are encoded as rules in the rule base (i.e. each rule can have a cost associated with it, not shown in the figures to avoid clutter). Non-limiting examples are S1 migrations cost $100, S2 migrations cost $150, S3 migrations cost $500 when conforming to standard supported migrations packages (FIG. 12) and custom pricing otherwise, and so on. Overall, companies typically make business decisions about what they want to migrate based on the cost of the migrations. Therefore, the challenge is to identify migration opportunities that are going to be compelling to the client.

If not, return to step 3506 and make refinements. If there is a match, select the provisioning approach in step 3512, using UI 3212 and service 3226, and in step 3514, set the provisioning engine configuration to effectuate the migration in accordance with the chosen technique. With reference again to FIG. 27, note on the left hand side thereof. Discovery 3104, which includes a number of elements that interacts with aspects of the invention. In the same way, on the right side of FIG. 27, note Provisioning Tools including provisioning functionality 4002, and underneath same, External Provisioning/Migration Tool 4004, External Provisioning/Migration Execution Service 4006, External Provisioning/Migration Status Service 4008, and External Migration Assessment Data 4010. The provisioning tools can be implemented in a variety of ways; for example, those mentioned elsewhere herein can be employed, such as the Blue Horse Application Migration Fixup tool, Server Provisioning Tool, Image Migration Tool aspects referenced in 2010-0318608 and/or 2010-0293168, and the like. Many of the components mentioned herein are tools that perform aspects of the migration. These are tied together by elements 3310 and 3312. In this regard, note that provisioning a server is one step in Migration for S6; Application Installation and Data Copy are others). An embodiment of an example Migration Step is provided in FIG. 22 for Database Migration.

In one or more embodiments, the design UI 3214 will pop up to prompt the user to enter the required information into the fields needed for the chosen approach. The downstream provisioning engines to be selected correspond to the chosen approach.

Thus, the output of FIG. 30 is a provisioning plan. Inventory 3304 in FIG. 28 can be obtained by known discovery techniques, or other techniques.

The rules are considered more-or-less back to front, as the rules for S6, S5 and so on are simple and exclude cases from S1 and so on.

All the rules have migration methods as results, e.g., "if the OS is Windows 2000, then use migration method S6."

In schema terms, in some instances, make migration method a fixed column in a table; alternatively, have a general table wherein additional attributes are defined for servers as attribute value pairs (server tags, e.g., server ID, attribute name migration type, attribute value S1). However, in some instances, a rules schema, even a general one, may not allow making server tags, at least not in any moderately elegant way. In some cases, one server tag implies adding a row to two different tables—a name-value pair, and a different table that links this to a server. In some cases, using tags means that it is possible to have multiple conflicting migration methods for one server. There is typically no simple way to make constraints over such a condition. With attributes, the situation is typically much clearer. Major and minor migration methods can be supported if needed.

Some embodiments employ a simple function "add_tag_to_server(physicalserverdimkey, tagtype, tagname)" which is included in the rules evaluation engine. An alternative is an attribute "MigrationMethod" of, say, VARCHAR 255, in PhysicalServerDim. For purposes of this non-limiting example, the latter is employed for simplicity and clarity. The rules are easy to change to the other variant.

Note that among the predefined rule types there is one about Migration Type, where the attribute changed is simply given as an abstract concept "Migration," but as that is not defined as an actual database attribute, and it may be desirable to later select all servers of certain migration types, a more concrete variant may be appropriate in some instances.

A server that is not migrated at all is encoded as MigrationMethod='None.' This could also be done by not giving a server a source server tag, but this may be less desirable if there is no clear scheme to distinguish initial non-candidates and later ones, and/or where deleting tags is yet another function that would need to be added to the rules schema.

S*, i.e., General Exclusions

The following table for each rule corresponds to a row in table RuleDim, except for the auto-generated RuleDimKey.

In the RuleXML the constant frame part is omitted for brevity; the UI will add that by itself in some instances.

The example looks as follows:

```
<?xml version="1.0" encoding="UTF-8"?>
<Rule xmlns="com.ibm.sunset.analytics.server.RuleSchema"
    xmlns:xsi="http://www.w3.org/2001/XMLSchema-instance"
    xsi:schemaLocation="com.ibm.sunset.analytics.server.RuleSchema
    WebContent/RuleSchema.xsd">
...
</Rule>
```

Windows Only: Although not part of the given rules, consider a non-virtualized server as a pre-condition in the non-limiting example.

| | |
|---|---|
| RuleName | Sstar-OS-Windows |
| Priority | 2 |
| Source | Customer |
| IsActive | 1 |
| RuleType | MigrationMethod |
| Notes | |
| RuleXML | `<If>` |
| | `    <Antecedent operator="OR">` |
| | `        <Literal>` |
| | `            <path>Source.OSShortName</path>` |
| | `            <operator>NEQ</operator>` |
| | `            <term>'Windows'</term>` |
| | `        </Literal>` |
| | `        <Literal>` |
| | `            <path>Source.isVirtualized</path>` |
| | `            <operator>EQ</operator>` |
| | `            <term>'1'</term>` |
| | `        </Literal>` |
| | `    </Antecedent>` |
| | `</If>` |
| | `<Then>` |
| | `    <Dependent operator="AND">` |
| | `        <Literal>` |
| | `            <path>Source.PhysicalServerDimKey.` |
| | `            MigrationMethod</path>` |
| | `            <operator>EQ</operator>` |
| | `            <term>'None'</term>` |
| | `        </Literal>` |
| | `    </Dependent>` |
| | `</Then>` |

With regard to `<path>Source.OSShortName</path>`, note that where the entire rules in a schema do not have common anchors, for OS-level rules the approach is workable, while software rules may be problematic in some instances.

With regard to `<term>'1'</term>`, "1" means "YES."

With regard to `<path>Source.PhysicalServerDimKey.MigrationMethod</path>`, recall that "Source" is a view, so in this example, nothing in it can be updated.

Disk Size: In one or more embodiments, the source view and the underlying PhysicalServerDim do not contain disk sizes. The attribute "ProvisionalDisk" indicates free disk space for additional provisioning of virtual machines. An overall disk size attribute is preferably added in one or more embodiments.

| | |
|---|---|
| RuleName | Sstar-DiskSize |
| Priority | 2 |
| Source | Customer |
| IsActive | 1 |

-continued

| | |
|---|---|
| RuleType | MigrationMethod |
| Notes | |
| RuleXML | `<If>` |
| |     `<Antecedent operator="AND">` |
| |         `<Literal>` |
| |             `<path>Source.PhysicalServerDimKey.OverallDiskSize</path>` |
| |             `<operator>GE</operator>` |
| |             `<term>256000</term>` |
| |         `</Literal>` |
| |     `</Antecedent>` |
| | `</If>` |
| | `<Then>` |
| |     `<Dependent operator="AND">` |
| |     `<Literal>` |
| |         `<path>Source.PhysicalServerDimKey.MigrationMethod</path>` |
| |         `<operator>EQ</operator>` |
| |         `<term>'None'</term>` |
| |     `</Literal>` |
| |     `</Dependent>` |
| | `</Then>` |

(20)

With regard to `<term>256000</term>`, in the non-limiting example, the individual disk sizes in the datamart are integers in megabytes (MB), so assume that this one is too for purposes of the experiment.

Memory Size:

| | |
|---|---|
| RuleName | Sstar-MemorySize |
| Priority | 2 |
| Source | Customer |
| IsActive | 1 |
| RuleType | MigrationMethod |
| Notes | |
| RuleXML | `<If>` |
| |     `<Antecedent operator="AND">` |
| |         `<Literal>` |
| |             `<path>Source.MemoryLimit</path>` |
| |             `<operator>GE</operator>` |
| |             `<term>32768</term>` |
| |         `</Literal>` |
| |     `</Antecedent>` |
| | `</If>` |
| | `<Then>` |
| |     `<Dependent operator="AND">` |
| |       `<Literal>` |
| |            `<path>Source.PhysicalServerDimKey.MigrationMethod</path>` |
| |            `<operator>EQ</operator>` |
| |            `<term>'None'</term>` |
| |       `</Literal>` |
| |     `</Dependent>` |
| | `</Then>` |

No High Availability:

| | |
|---|---|
| RuleName | Sstar-HA |
| Priority | 2 |
| Source | Customer |
| IsActive | 1 |
| RuleType | MigrationMethod |
| Notes | |
| RuleXML | `<If>` |
| |     `<Antecedent operator="OR">` |
| |         `<Literal>` |
| |             `<path>Source.PhysicalServerDimKey:AppOverview.hardware_or_software_load_balanced_clustered</path>` |
| |             `<operator>EQ</operator>` |
| |             `<term>'Hardware'</term>` |
| |         `</Literal>` |
| |         `<Literal>` |
| |             `<path>Source.PhysicalServerDimKey:AppOverview.` |

```
                    hardware_or_software_load_balanced_clustered</path>
                            <operator>EQ</operator>
                            <term>'Software'</term>
                        </Literal>
                </Antecedent>
        </If>
        <Then>
            <Dependent operator="AND">
                <Literal>
                    <path>Source.PhysicalServerDimKey.MigrationMethod</path>
                    <operator>EQ</operator>
                    <term>'None'</term>
                </Literal>
            </Dependent>
        </Then>
```

With regard to hardware_or_software_load_balanced_clustered</path>, the operator ":" is defined for one-to-many relationships. In this non-limiting example, assume that this means that a table name can be listed after the operator, and if that table has a foreign key back to the table before the ":," then all rows are obtained in the named table that refer to the row that one was in before the ":," and the outer operator; here "OR" is applied to them. In the non-limiting example, the foreign key back is "Server_ID," and thus an additional interpretation step is appropriate wherein the foreign key is equated to the primary key PhysicalServerDimKey of PhysicalServerDim.

S6: Application Migration if Older OS Version
 OS Version:

rules, thus ensuring servers only get into the S6 category if they have no S* exclusions. Higher numbers are lower priorities.

S4/5: Software Upgrades

Purely for purposes of illustration, the present example does not necessarily make a clear distinction between middleware and application in the S4/S5 contexts, and considers only the WEBSPHERE and DB2 applications, so the example considers S4, and does not have any S5.

Software Version as S4: In this non-limiting example, it may not be possible to navigate from "SourceView," because the software name and version from the same software may be needed. It is possible to navigate back from software, but the fact that there is no common anchor in these rule types

| | |
|---|---|
| RuleName | S6-OS-Version |
| Priority | 3 |
| Source | Customer |
| IsActive | 1 |
| RuleType | MigrationMethod |
| Notes | |
| RuleXML | `<If>` |

```
            <Antecedent operator="AND">
                <Literal>
                    <path>Source.OSVersion</path>
                    <operator>NEQ</operator>
                    <term>'2003'</term>
                </Literal>
                <Literal>
                    <path>Source.OSVersion</path>
                    <operator>NEQ</operator>
                    <term>'2008'</term>
                </Literal>
            </Antecedent>
        </If>
        <Then>
            <Dependent operator="AND">
                <Literal>
                    <path>Source.PhysicalServerDimKey.MigrationMethod</path>
                    <operator>EQ</operator>
                    <term>'S6'</term>
                </Literal>
            </Dependent>
        </Then>
```

With regard to Priority 3, as these rules have a priority concept, it is possible to make this lower priority than the S* may make the situation ambiguous, i.e., the rule semantic as described does not state that the two literals in the antecedent refer to the same row in the software table, nevertheless, but this is needed, in the non-limiting example, to get the correct result. Other embodiments could employ a different approach.

```
RuleName  S4-DB2-selection
Priority  4
Source    Customer
IsActive  1
RuleType  MigrationMethod
Notes
RuleXML   <If>
              <Antecedent operator="AND">
                  <Literal>
                      <path>SoftwareDim.Subclass</path>
                      <operator>EQ</operator>
                      <term>'DB2'</term>
                  </Literal>
                  <Literal>
                      <path>SoftwareDim.Version</path>
                      <operator>NOT LIKE</operator>
                      <term>'9%'</term>
                  </Literal>
              </Antecedent>
          </If>
          <Then>
              <Dependent operator="AND">
                <Literal>
                    <path>SoftwareDim.PhysicalServerDimKey.MigrationMethod</path>
                    <operator>EQ</operator>
                    <term>'S4'</term>
                </Literal>
              </Dependent>
          </Then>
```

With regard to <operator>NOT LIKE</operator>, assume for illustrative purposes that string comparison/pattern matching operators such as "LIKE" and "NOT LIKE" are present, as in the SQL language.

With regard to <term>'9%'</term>, assume for this illustrative example that all versions starting with 9 are good enough.

Now a similar example is provided for WEBSPHERE. Some instances could employ a more complex path expression like {4,5}* or an antecedent like "IF subclass=WAS and (version=4 or version=5)."

```
RuleName  S4-WAS4-selection
Priority  4
Source    Customer
IsActive  1
RuleType  MigrationMethod
Notes
RuleXML   <If>
              <Antecedent operator="AND">
                  <Literal>
                      <path>SoftwareDim.Subclass</path>
                      <operator>EQ</operator>
                      <term>'WAS'</term>
                  </Literal>
                  <Literal>
                      <path>SoftwareDim.Version</path>
                      <operator>LIKE</operator>
                      <term>'4%'</term>
                  </Literal>
              </Antecedent>
          </If>
          <Then>
              <Dependent operator="AND">
                <Literal>
                    <path>SoftwareDim.PhysicalServerDimKey.MigrationMethod</path>
                    <operator>EQ</operator>
```

-continued

```
            <term>'S4'</term>
        </Literal>
    </Dependent>
</Then>
``` xxx

| | |
|---|---|
| RuleName | S4-WAS5-selection |
| Priority | 4 |
| Source | Customer |
| IsActive | 1 |
| RuleType | MigrationMethod |
| Notes | |
| RuleXML | `<If>` |

```
<If>
    <Antecedent operator="AND">
        <Literal>
            <path>SoftwareDim.Subclass</path>
            <operator>EQ</operator>
            <term>'WAS'</term>
        </Literal>
        <Literal>
            <path>SoftwareDim.Version</path>
            <operator>LIKE</operator>
            <term>'5%'</term>
        </Literal>
    </Antecedent>
</If>
<Then>
    <Dependent operator="AND">
        <Literal>
            <path>SoftwareDim.PhysicalServerDimKey.MigrationMethod</path>
            <operator>EQ</operator>
            <term>'S4'</term>
        </Literal>
    </Dependent>
</Then>
```

With regard to `<path>SoftwareDim.Subclass</path>`, where there is no documentation about software names and subclasses used, it is possible to proceed with subclass, as in middleware_install_master in the SCOPE DB.

Software Version, Actual Upgrade: Specifically for software upgrades, in some instances, a REPLACE operator can be employed, rather than the normal equalities in other rules and the general rules schema. In some cases, the underlying target software table contains no pointer to the corresponding source software table; hence, there are many WAS 6.1 instances in the target, there is no indication which of them is, say, the WAS 5.1 from the source and which is the WAS 6.0 from the source. This can be taken into consideration as appropriate.

S4 is used as a precondition. This might not be necessary in this non-limiting case (because non-WINDOWS isn't migrated at all in the example), but such preconditions may be appropriate in more general cases. This might be hard to express if MigrationMethod were just a tag, because of lack of tag navigability.

| | |
|---|---|
| RuleName | S4-DB2-upgrade-1 |
| Priority | 4 |
| Source | Customer |
| IsActive | 1 |
| RuleType | Application Selection |
| Notes | |
| RuleXML | `<If>` |

```
<If>
    <Antecedent operator="AND">
        <Literal>
            <path>SoftwareDim.PhysicalServerDim.MigrationMethod</path>
            <operator>EQ</operator>
            <term>'S4'</term>
        </Literal>
    </Antecedent>
</If>
<Then>
    <Dependent operator="AND">
        <Literal>
            <path>App</path>
            <operator>REPLACE</operator>
            <term>'DB2 Enterprise Edition@8.1.1, DB2 Enterprise
```

-continued

```
            Edition@9.7'</term>
                </Literal>
            </Dependent>
        </Then>
```

With regard to <path>App</path>, this is prescribed for software replace rules. This concept is called "software" in other instances, while "app" stands for business applications. The skilled artisan will appreciate what is meant from the context.

Dozens more such rules can be developed, with all software names of DB2, and all individual versions, and then the same for WAS. The skilled artisan will be able to develop such rules, given the teachings herein, for other types of application software, as well.

S3: Distributed

In these scenarios, "distributedness" only seems to play a role for address relinking. Hence it should be used with lower priority than rules about addresses staying constant that place servers into S1.

Server Not Alone in Application: The first rule that characterizes a server s as belonging to a distributed application has the following logical structure:

table also start in the same row, so start in the row of a specific physical server. The "term" part gives the ID of this server; call this "s" as in the formula above. In the "path" part, select each row in table "App_overview" that has a foreign key to the given server row, in an overall OR. The foreign key is Server_ID, so here select all rows with Server_ID=s. The next navigation is to Application_component_name in the same row, call this "a" as in the formula above. Now navigate again with an "all," here to all rows in App_overview that have "a" as their application_component_name. So there is now an arbitrary second app_overview row, say r2, with the same application_component_name. Navigate to its Server_ID, say s2, and compare that with s.

Since still under the overall "OR," the antecedent is fulfilled if there is any such $s2 \neq s$.

| | |
|---|---|
| RuleName | S3-multi-server-app |
| Priority | 6 |
| Source | Customer |
| IsActive | 1 |
| RuleType | MigrationMethod |
| Notes | |
| RuleXML | ```<If>
    <Antecedent operator="OR">
        <Literal>
<path>PhysicalServerDim:App_overview.Application_component_name:
App_overview.Server_ID</path>
            <operator>NEQ</operator>
            <term>PhysicalServerDim.PhysicalServerDimKey</term>
        </Literal>
    </Antecedent>
</If>
<Then>
    <Dependent operator="AND">
        <Literal>
            <path>PhysicalServerDim.MigrationMethod</path>
            <operator>EQ</operator>
            <term>'S3'</term>
        </Literal>
    </Dependent>
</Then>``` |

∃ PhysicalServerDimKey s2, application_component_name a:

$s2 \neq s \wedge$ server_in_app$(s, a) \wedge$ server_in_app$(s2, a)$

The relation server_in_app(s, a) means that there is a row in table App_overview that contains server_ID s and Application_component_name a.

This can be expressed in the current rules structure, for example, using the not fully specified ":" navigation as follows.

The meaning of the following formula is as follows: As before, assume that two different paths starting in the same Server in Several Applications: The second rule that characterizes a server s as belonging to a distributed application has the following logical structure:

∃ application_component_name a, a2:

$a2 \neq a \wedge$ server_in_app$(s, a) \wedge$ server_in_app$(s, a2)$

Both paths in the antecedent have the one-to-many navigation from a PhysicalServerDimKey s to rows in App_overview with s as their Server_ID. In both cases, look up the Application_component_name, say a and a2. The overall OR ensures that if any such a and a2 are unequal, case S3 (with the given rule priority) is the pertinent case.

| | |
|---|---|
| RuleName | S3-multi-app-server |
| Priority | 6 |
| Source | Customer |
| IsActive | 1 |

| | |
|---|---|
| RuleType | MigrationMethod |
| Notes | |
| RuleXML | <If><br>    <Antecedent operator="OR"><br>        <Literal><br>           <path>PhysicalServerDim:App_overview.Application_component_name</path><br>           <operator>NEQ</operator><br>           <term>PhysicalServerDim:App_overview.Application_component_name</term><br>        </Literal><br>    </Antecedent><br></If><br><Then><br>    dependent operator="AND"><br>      <Literal><br>        <path>PhysicalServerDim.MigrationMethod</path><br>        <operator>EQ</operator><br>        <term>'S3'</term><br>      </Literal><br>    </Dependent><br></Then> |

Affinities: One criterion for S3 is that dependencies need to be relinked afterwards. Almost all servers have some dependencies nowadays, e.g., even print servers, which are typically characterized as easy migrations, have clients contacting them. Hence typical migrations try to retain addresses, at least Domain Name System (DNS) names and often also IP addresses, so that in spite of the dependencies no relinking is needed.

Here, however, information about address changes is not available, so plain rules about dependencies are made first. They are in the table server_relationships.

Assume that there is only interest in incoming dependencies, because only those need the addresses fixed if this server is moved. Hence the logical structure of this rule for a server s is:

∃ server s2: server_dependency(s, s2).

The table server_relationships is not complete for this purpose: It contains columns:
source_physicalserverdimkey bigint references physicalserverdim (physicalserverdimkey) on delete cascade,
target_physicalserverdimkey bigint references physicalserverdim (physicalserverdimkey) on delete cascade This means that only relations where both servers are in the discovered set are shown. However, dependencies from other servers are equally important in this case.

| | |
|---|---|
| RuleName | S3-server-dependency |
| Priority | 6 |
| Source | Customer |
| IsActive | 1 |
| RuleType | MigrationMethod |
| Notes | |
| RuleXML | <If><br>    <Antecedent operator="OR"><br>        <Literal><br>           <path>Server_relationship.destination_host</path><br>           <operator>NEQ</operator><br>           <term>''</term><br>        </Literal><br>    </Antecedent><br></If><br><Then><br>    <Dependent operator="AND"><br>        <Literal><br>           <path>Server_relationship.destination_host.MigrationMethod</path><br>           <operator>EQ</operator><br>           <term>'S3'</term><br>        </Literal><br>    </Dependent><br></Then> |

With regard to <path>Server_relationship.destination_host</path>, in some instances it is not possible to navigate from a server to rows in server_relationship with ":tablename" as before, because this time the table has two foreign keys to servers. In some cases, introduce a notation ":tablename[column]." In the current case, this can be avoided by starting the expression in the server_relationship table.

With regard to <term>''</term>, the condition that the hostname is not the empty string is not there for itself. It is preferable that a row with this destination host exists, but it is preferable to write it as some comparison, so this is a harmless one that does not exclude any hosts.

With regard to MigrationMethod</path>, navigations are typically written as x.yDimKey.z and it is assumed that yDimKey navigated to table y. In this case destination_host is a foreign key for PhysicalServerDimKey.

Consider now another non-limiting exemplary manner of specifying rules. In this non-limiting example, assume the source servers are all physical. Consider the rules primarily back to front, as the rules for S6, S5 and so on are simple and exclude cases from S1 and the like.

S*, i.e., General Exclusions

Consider here plain SQL queries, not rules, so all the S* rules go into one query. A view is created:

```
create view VSO_SStar as
(select * from baseline_master
  where
    os_name like '%Windows%'
    and total_filesystem_capacity <= 250
    -- this is in GB already
    and
      (mem_avg is null and host_physicalmemoryMB <= 32768
        or mem_avg * host_physicalmemoryMB <= 3276800)
      -- The former is percent
```

Utilization was used for these two, rather than physical parameters, because servers with low real memory/disk usage and high physical memory/disk should be good consolidation candidates.

Now architectural control:

and admin_email address like '%.ibm.com'

"Manager" might be a more suitable field in some instances. Now, consider disaster_recovery and availability:

and DR_partners is null
and DR_requirement is null
and DR_server is null
and DR_site is null Some cases potentially use Interview_app_master.availability too. In some cases, inclusion of application clusters implies that research and replatform_approved='yes'

```
      -- upgrade_replace_retire_date
)
```

In some cases, test with the following view:

```
create view tmp_VSO_SStar as
(select * from baseline master
  where
    os_name like '%Windows%'
    and total_filesystem_capacity <= 250
    and
      (mem_avg is null and host_physicalmemoryMB <= 32768
        or mem_avg * host_physicalmemoryMB <= 3276800)
)
```

379 Servers in ECM

S6: Application Migration if Older OS Version

Recall that this example considers only Windows. Here the understanding is that anything older than Windows 2003 is "old." That starts with version 5.2; 4 is added for safety.

```
create view VSO_S6 as
(select * from VSO_SStar
  where substr(OS_version, 1, 1) in ('1', '2', '3', '4')
    or substr(OS_version, 1, 3) in ('5.0', '5.1'))
```

In some cases, for testing on ECM:

```
create view tmp_VSO_S6 as
(select * from tmp_VSO_SStar
  where substr(OS_version, 1, 1) in ('1', '2', '3', '4')
    or substr(OS_version, 1, 3) in ('5.0', '5.1'))
```

S4/5: Software Upgrades

In some cases, the difference between middleware and application in the S4/S5 texts is blurred. In some cases, count as S4, and do not have any S5.

```
create view VSO_S4 as
(select * from VSO_SStar
  where
    host_name not in
      (select host_name from VSO_S6)
  and
    (host_name in
      (select host_name from middleware_install_master
        where mw_subclass = 'DB2'
        and mw_version not like '9%')
        -- Used 'subclass' because DB2 has about 20 product names,
        e.g.,
        -- DB2 Universal Database Edition for ...
    or host_name in
      (select host_name from middleware_install_master
        where mw_subclass = 'WAS'
        and substr(mw_version, 1, 1) in ('1', '2', '3', '4', '5'))
    )
)
```

S3: Distributed

Recall that in these scenarios, in at least some cases, distributed-ness only seems to play a role for address re-linking. Hence it should be used with lower priority than rules about addresses staying constant that place servers into S1.

One-to-one mapping between Servers and Applications: The first rule that characterizes a server s as belonging to a distributed application has the following logical structure, saying that s is not alone in an application.

∃ server $s_2$, application a:
$s_2 \neq s \wedge$ server_in_app(s, a) $\wedge$ server_in_app($s_2$, a).

The second rule that characterizes a server s as belonging to a distributed application expresses that the server belongs to several applications, it has the following logical structure:

∃ application_component_name a, $a_2$:
$a_2 \neq a \wedge$ server_in_app(s, a) $\wedge$ server_in_app(s, $a_2$).

SCOPEDB represents a primary application for a server differently from secondary ones. Given the second rule, it is possible to concentrate on the primary one in the first rule. In some cases, create an intermediate view for the first rule.

```
create view business_app_server_count
    (business_app,
      count)
  as
  (select
    cust_primary_business_app,
    count(distinct host_name)
  from baseline_master
  group by cust_primary_business_app
  )
```

If this were the only criterion, the following view would be obtained, but at least some instances don't actually create it:

```
create view VSO_S3_part1 as
(select * from VSO_SStar
```

```
            where
              host_name not in
                 (select host_name from VSO_S6)
              and host_name not in
                 (select host_name from VSO_S4)
              and
                 (cust_primary_business_app in
                   (select business_app
                     from business_app_server_count
                     where
                        business_app is not null
                        and count > 1)
                   or secondary_business_apps is not null
                 )
            )
```

Affinities: One criterion for S3 is that dependencies need to be re-linked afterwards. Almost all servers have some dependencies nowadays, e.g., even print servers, which are typically characterized as easy migrations, have clients contacting them. Hence typical migrations try to retain addresses, at least DNS names and often also IP addresses, so that in spite of the dependencies no re-linking is needed. Here, however, information about address changes may not be available, so plain rules about dependencies are addressed first. Assume that the only interest is in incoming dependencies, because only those need the addresses fixed if this server is moved. Hence the logical structure of this rule for a server s is:

$\exists$ server $s_2$: server_dependency$(s, s_2)$.

In one or more embodiments, define the following conditions:

```
            (host_name in
              (select destination_host
                from affinity_server_master
                where source_host <> destination_host)
            or host_name in
              (select other_host_name
                from middleware_dependencies_gal
                where this_host_name <> other_host_name
                  and direction = 'out')
            or host_name in
              (select this_host_name
                from middleware_dependencies_gal
                where this_host_name <> other_host_name
                  and direction = 'in')
            )
```

As this is still quite short overall, and one view is easier to maintain than many (one can't change a sub-view without also recreating a view that's based on it), in one or more embodiments, make this one big view:

```
create view VSO_S3 as
(select * from VSO_SStar
  where
    host_name not in
      (select host_name from VSO_S6)
    and host_name not in
      (select host_name from VSO_S4)
    and
      (cust_primary business_app in
        (select business_app
          from business_app_server_count
          where
            business_app is not null
            and count > 1)
        or secondary_business_apps is not null
        or scope.sanitize_hostname(host_name) in
          (select scope.sanitize_hostname(destination_host)
            from affinity_server_master
            where source_host <> destination_host)
        or scope.sanitize_hostname(host_name) in
          (select scope.sanitize_hostname(other_host_name)
            from middleware_dependencies_gal
            where this_host_name <> other_host_name
              and direction = 'out')
        or scope.sanitize_hostname(host_name) in
          (select scope.sanitize_hostname(this_host_name)
            from middleware_dependencies_gal
            where this_host_name <> other_host_name
              and direction = 'in')
      )
)
```

In an experimental ECM test version:

```
create view tmp_VSO_S3 as
(select * from tmp_VSO_SStar
  where
    host_name not in
      (select host_name from tmp_VSO_S6)
    and host_name not in
      (select host_name from tmp_VSO_S4)
    and
      (cust_primary_business_app in
        (select business_app
          from business_app_server_count
          where
            business_app is not null
            and count > 1)
        or secondary_business_apps is not null
        or scope.sanitize_hostname(host_name) in
          (select scope.sanitize_hostname(destination_host)
            from affinity_server_master
            where source host <> destination_host)
        or scope.sanitize_hostname(host_name) in
          (select scope.sanitize_hostname(other_host_name)
            from middleware_dependencies_gal
            where this_host_name <> other_host_name
              and direction = 'out')
        or scope.sanitize_hostname(host_name) in
          (select scope.sanitize_hostname(this_host_name)
            from middleware_dependencies_gal
            where this_host_name <> other_host_name
              and direction = 'in')
      )
)
```

S2: The Rest

In some cases lacking any criteria to distinguish S1 and S2, and where S1 is riskier, put all the remaining servers from S* into S2.

```
create view tmp_VSO_S2 as
(select * from tmp_VSO_SStar
  where
    host_name not in
      (select host_name from tmp_VSO_S6)
    and host_name not in
      (select host_name from tmp_VSO_S4)
    and host_name not in
      (select host_name from tmp_VSO_S3))
```

Exemplary Ready-to-Deploy Code

Herein is presented exemplary code to apply to a SCOPEDB as one command.

```
create view VSO_SStar as
(select * from baseline_master
```

```
where
    os_name like '%Windows%'
    and total_filesystem_capacity <= 250
    and
        (mem_avg is null and host_physicalmemoryMB <= 32768
         or mem_avg * host_physicalmemoryMB <= 3276800)
    and admin_email_address like '%.ibm.com'
    and DR_partners is null
        and DR_requirement is null
        and DR_server is null
        and DR_site is null
    and replatform_approved = 'yes'
)
@
create view VSO_S6 as
(select * from VSO_SStar
    where substr(OS_version, 1, 1) in ('1', '2', '3', '4')
       or substr(OS_version, 1, 3) in ('5.0', '5.1'))
@
create view VSO_S4 as
(select * from VSO_SStar
 where
 host_name not in
    (select host_name from VSO_S6)
 and
    (host_name in
        (select host_name from middleware_install_master
            where mw_subclass = 'DB2'
              and mw_version not like '9%')
            -- Used 'subclass' because DB2 has about 20 product names,
            e.g.,
            -- DB2 Universal Database Edition for ...
     or host_name in
        (select host_name from middleware_install_master
            where mw_subclass = 'WAS'
              and substr(mw_version, 1, 1) in ('1', '2', '3', '4', '5'))
    )
)
@
create view business_app_server_count
        (business_app,
         count)
    as
    (select
        cust_primary_business_app,
        count(distinct host_name)
     from baseline_master
     group by cust_primary_business_app
    )
@
create view VSO_S3 as
(select * from VSO_SStar
 where
 host_name not in
    (select host_name from VSO_S6)
 and host_name not in
    (select host_name from VSO_S4)
 and
    (cust_primary_business_app in
        (select business_app
         from business_app_server_count
         where
            business_app is not null
            and count > 1)
     or secondary_business_apps is not null
     or scope.sanitize_hostname(host_name) in
        (select scope.sanitize_hostname(destination_host)
         from affinity_server_master
         where source_host <> destination_host)
     or scope.sanitize_hostname(host_name) in
        (select scope.sanitize_hostname(other_host_name)
         from middleware_dependencies_gal
         where this_host_name <> other_host_name
            and direction = 'out')
     or scope.sanitize_hostname(host_name) in
        (select scope.sanitize_hostname(this_host_name)
         from middleware_dependencies_gal
         where this_host_name <> other_host_name
            and direction = 'in')
    )
)
@
create view VSO_S2 as
(select * from VSO_SStar
 where
 host_name not in
    (select host_name from VSO_S6)
 and host_name not in
    (select host_name from VSO_S4)
 and host_name not in
    (select host_name from VSO_S3))
```

Exemplary Migration Scenarios

Figure 2:
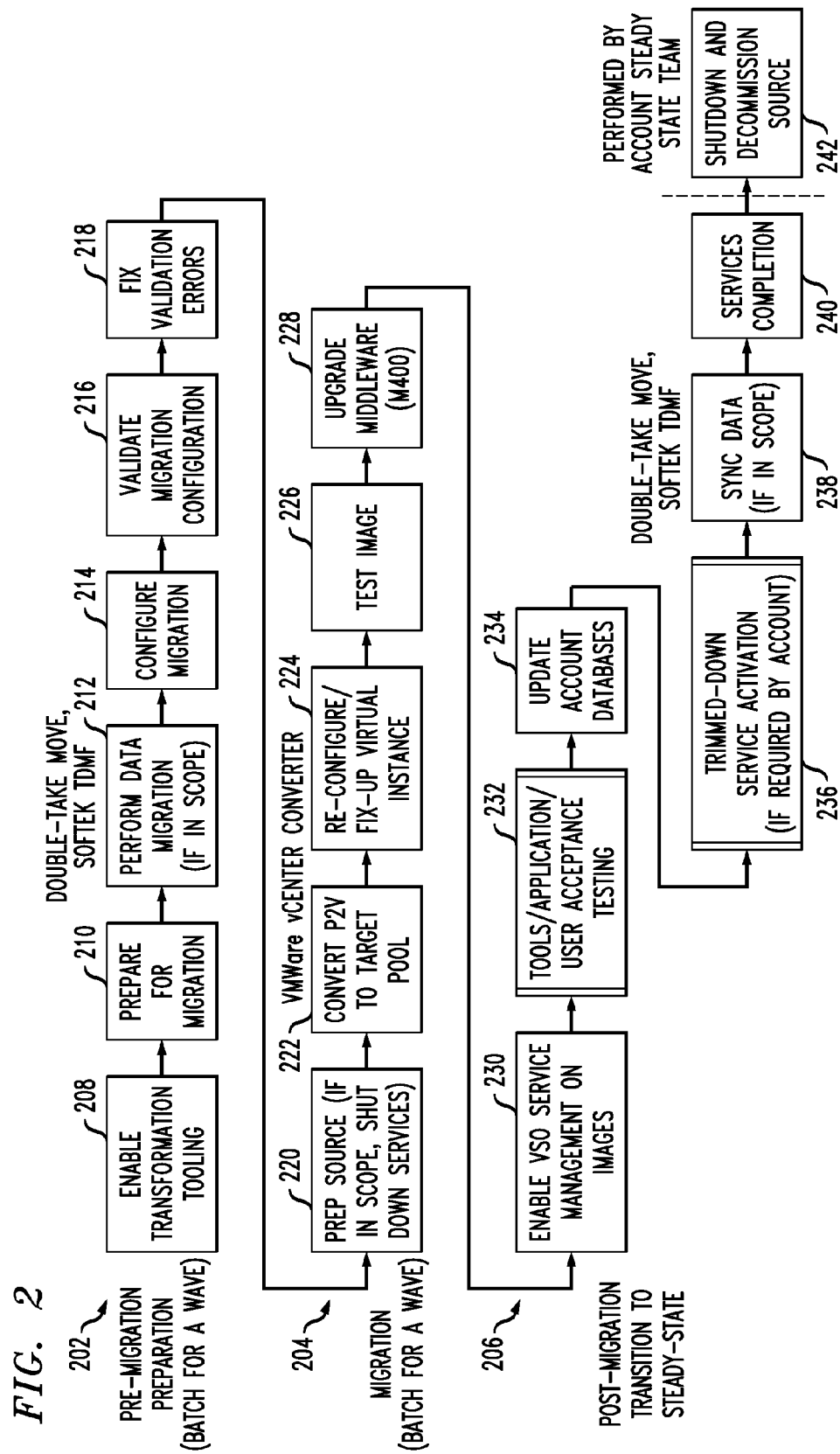
FIG. 2 shows a flow chart of exemplary method steps for carrying out migration phase 3 for type S4 migration of exemplary application server software, according to an aspect of the invention.
Figure 3:
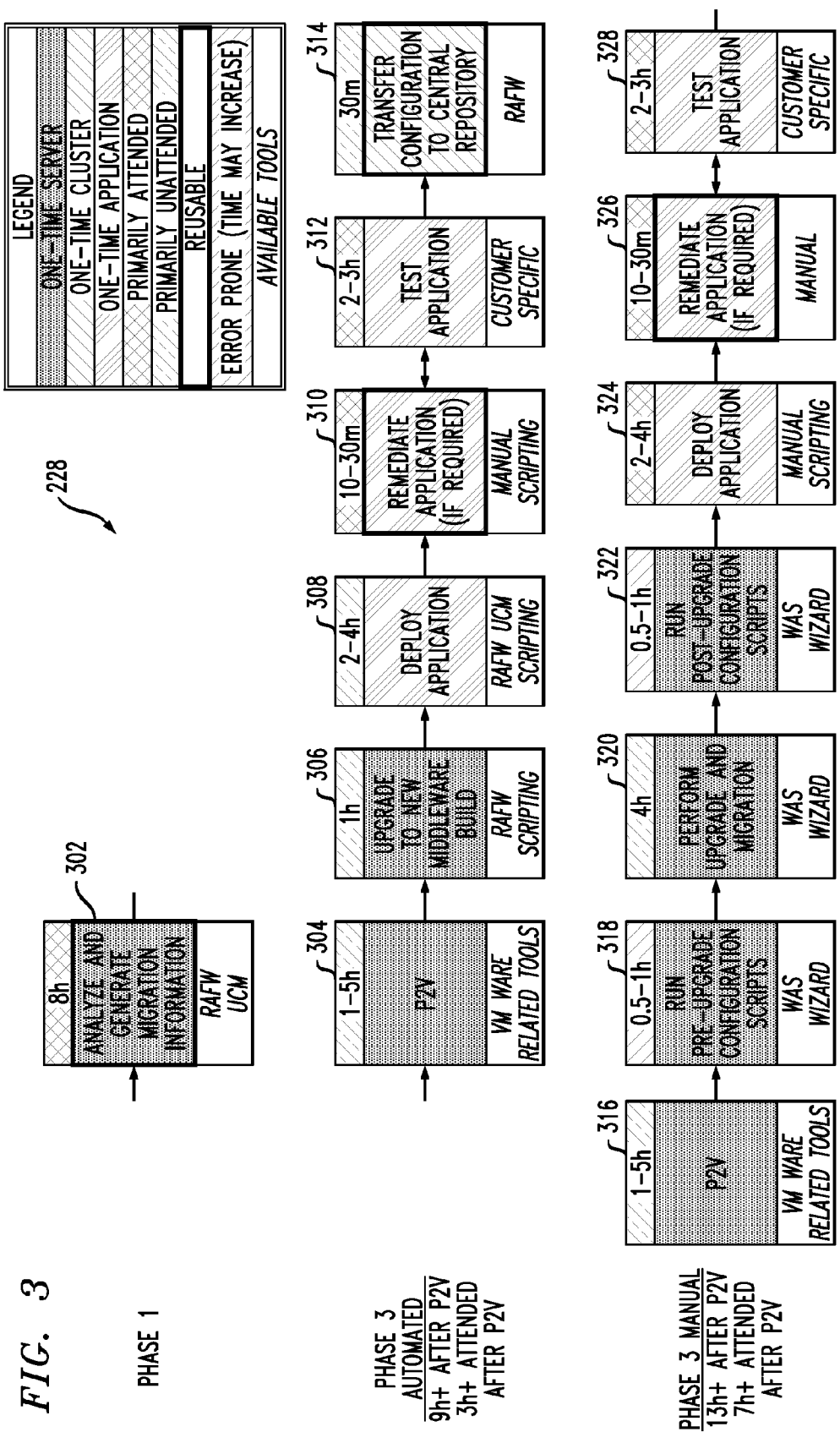
FIG. 3 shows a flow chart of exemplary method steps for carrying out step 228 in FIG. 2, according to an aspect of the invention.

By way of review, referring again back to FIG. 1, decision logic can be followed based on the discovered source specification and stated target specification, and a set of rules set forth, which are executed to select the appropriate transformation methodology. That is to say, by carrying out the logical process in FIG. 1, the appropriate manner of migration to undertake can be ascertained, i.e., S1, S2, and so on. For example, following the decision tree from the start with respect to S4, only the middleware is being upgraded. Referring now to FIG. 2, which presents exemplary details for an S4 scenario, note pre-migration preparation row 202, migration row 204, and post-migration row 206. The decision logic referred to herein is used during migration. Note "upgrade middleware" step 228, which is shown in greater detail in FIG. 3. It should be noted that the discussion regarding characterization is defined down; e.g., for middleware upgrades, for a particular workload, there may be more than one middleware package which needs to be updated. FIG. 3 depicts a non-limiting example in the context of an upgrade for Websphere Application Server® (WAS) (registered mark of International Business Machines Corporation, Armonk, N.Y., USA)(Phase 3, S4 details). Note that an even more detailed description of tasks, called a "run book," can ultimately be prepared. The skilled artisan, given the teachings herein, can prepare such a run book as needed.

Thus, the characterization of the source and the specification of the target, coupled with the decision logic in the middle (e.g., indicating that there is a middleware upgrade involved) provides an appropriate level of detail for the particular scenario and use case. Note that, in the non-limiting example, M400 refers to an on-image WEBSPHERE application upgrade, while a DB2 upgrade is referred to as M200. In the case of an application which has a server running WAS and DB2, M200 would be performed before M400, and then the post-migration configuration fix-up would be undertaken for each.

Still referring to FIG. 2, in step 208; enable transformation tooling; in step 210, prepare for migration; in step 212, perform data migration if the same is in-scope; in step 214, configure the migration; in step 216, validate the migration configuration, and in step 218, fix any validation errors. Furthermore, in step 220, prepare the source (if in scope, shutting down the services); in step 222, convert to an appropriate target pool; in step 224, reconfigure and/or fix up the virtual instance(s); in step 226, test the image(s), and in step 228, upgrade the middleware. Even further, in step 230, enable service management on the images; in step 232, carry out tools and/or application user acceptance testing; in step 234, upgrade account databases; in step 236, carry out any required trimmed-down service activation; in step 238, synch the data, if in-scope, and in step 240, completion is achieved, followed by shut-down and decommissioning of the source in step 242.

Referring now to FIG. 3, which shows exemplary details of step 228, in step 302, analyze and generate migration information; in step 304, perform physical-to-virtual using one of the many off-the-shelf products; in step 306, upgrade to the new middleware build; in step 308, deploy the application; in step 310, carry out any required remediation; in step 312, test the application, and in step 314, transfer configuration to the control repository. The preceding represents an automated aspect. With regard to a manual aspect, in step 316, perform physical-to-virtual using one of the many off-the-shelf products; in step 318, run any pre-update configuration scripts; in step 320, perform upgrade and migration; in step 322, run any post-upgrade configuration scripts; in step 324, deploy the application; in step 326, carry out any required remediation; and in step 328, test the application.

One or more embodiments provide rules materialized on top of the analytics tooling and data discovery tooling, as well as a set of tools which effect the various changes referred to. In some cases, the step between the two is a manual step. FIGS. 26-30 present aspects of a SW component model that takes the output of one and feeds it into the input of the other.

One or more embodiments output the appropriate value of S1-S6; in S1, image migration technology can be employed (various products are known to the skilled artisan, e.g., VMware vCenter Converter™ product available from VMware, Inc., Palo Alto, Calif. 94304 USA, or the PLATESPIN® product available from Novell, Waltham, Mass. 02451, USA will carry out image migration). One or more embodiments output directives, such as, for example, "Use V Center Converter with the following parameters, and go ahead."

In one or more embodiments, analysis is carried out by the decision logic set forth above in the portion headed "Expression of a Migration Method in Rules," and the result is a specification saying, e.g., "this is an S1 workload." Note that a characterization of the source and target are already in hand. At present, S1 is effectuated using VM Ware's V Center Converter. Thus, indicating to the responsible parties that there is an S1 scenario, with known source and target, is enough for them to do the job. Note that the decision logic is preferably encoded in the discovery analysis tooling. The output is, e.g., "S4," or "S2," or "S2 with DB2, middleware, and WAS." An exemplary SW architecture and flow chart(s) for the decision logic are provided in FIGS. 26-30, as is a SW architecture for a SW system that sits in the middle, takes the output of one, and gives it to the other.

One or more embodiments make use of the DARWIN Information Typing Architecture framework, available from International Business Machines Corporation, Armonk, N.Y., USA, for S6 scenarios. See, e.g., co-assigned US Patent Publication 2011-0107327, May 5, 2011, of Eric J. Barkie et al., entitled "ASSISTING SERVER MIGRATION"; the complete disclosure of same is expressly incorporated herein by reference in its entirety for all purposes. The configuration information is pulled from the same database that each analysis runs on top of. In some embodiments, pushing the actual S1 or S6 migration is carried out manually.

Consider now an exemplary end-to-end process, as seen in FIGS. 2 (drill-down of phase 3) and 4 (drill-down of phases 0-2). Note that examples are presented in the context of X86 systems, but this is not intended as limiting. Indeed, in some instances, provisioning tools capable of provisioning to a wide variety of computing environments can be employed, e.g., SYSTEM P®, SYSTEM Z®, cloud computing environments, VM Ware's V Center VSX® environment, and the like (registered marks of, respectively, International Business Machines Corporation, Armonk, N.Y., USA and VMware, Inc., Palo Alto, Calif., USA).

Figure 4:
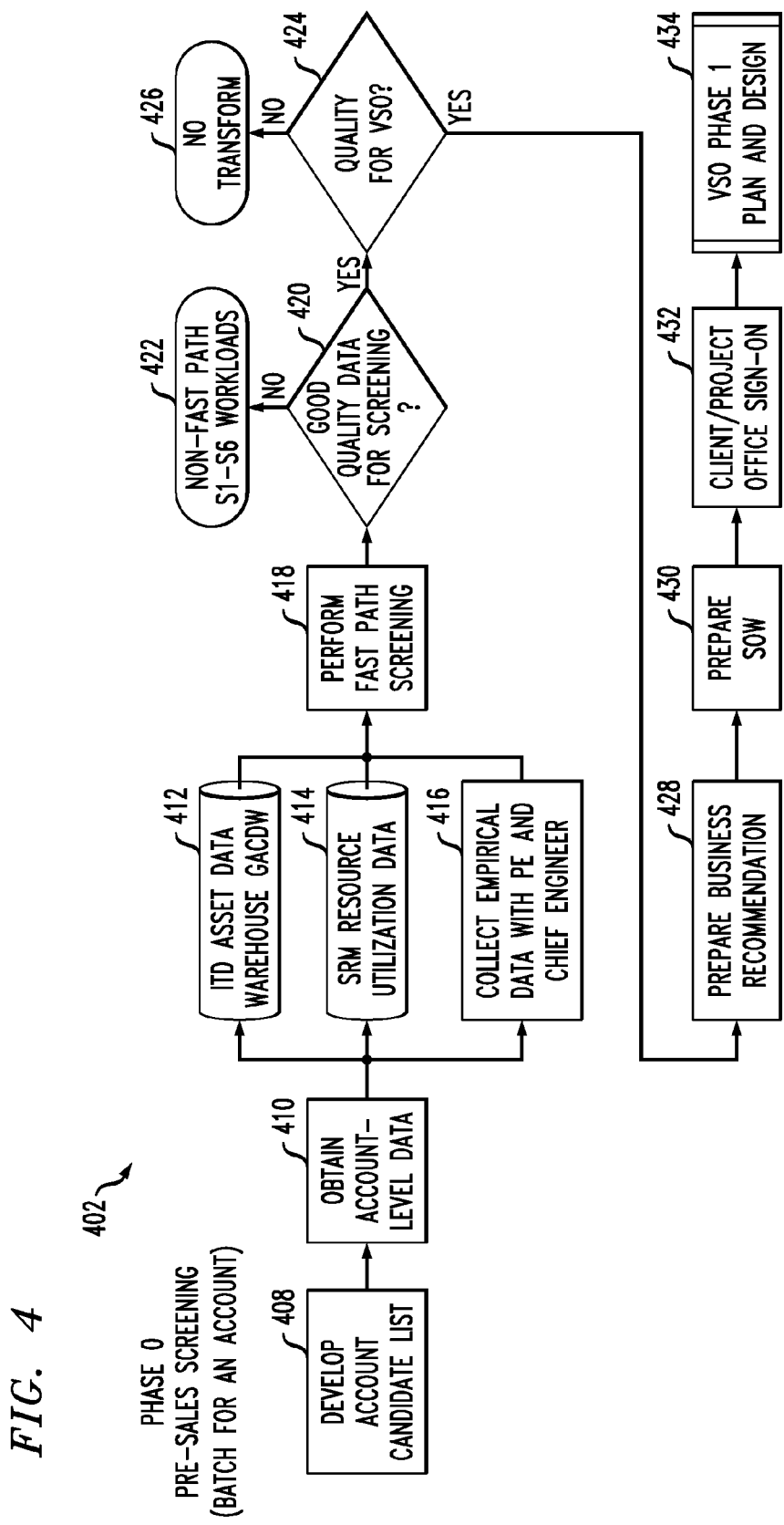
FIG. 4 shows a flow chart of exemplary method steps for carrying out migration phases 0-2 for type S1-S6 migration of exemplary application server software, according to an aspect of the invention.
Figure 4:
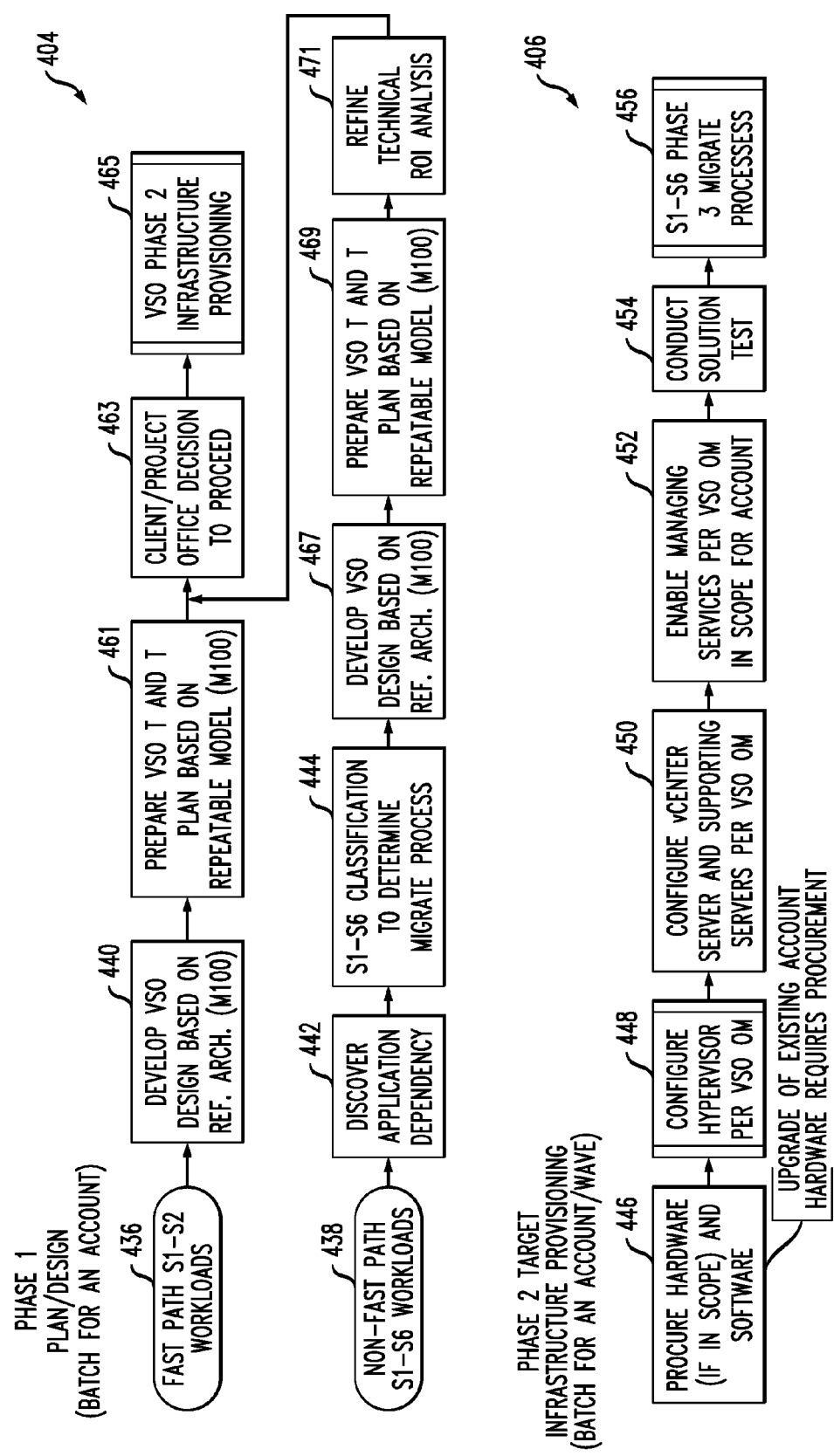

In FIG. 4, note rows 402, 404, 406 corresponding respectively to Phases 0, 1, and 2. Depicted is a systematic method for identifying workload for migration and then effectuating the migration across accounts. Phase 0 includes identifying candidates. Phase 0 includes an analysis carried out across the accounts for suitability of migration, along with a follow-up more detailed analysis and discovery for accounts which have been identified. Coming out of Phase 0, it may be assumed that the client has signed a statement of work to actually carry out the migrations. Thus, Phase 1 involves planning and designing the solution, while Phase 2 involves building out the target infrastructure for that solution. Phase 3, depicted in FIG. 2, is broken into sub-phases, but basically involves actually carrying out the migration, i.e., pre-migration prep 202, actual migration 204, and post-migration activity 206.

In essence, the tying of configuration data to the migration approach adopted is replicated in the depicted overall structure, that is, not only is the actual per-server or per-workload method tied based on a characterization of the particular workload, but rather an analysis across all accounts is tied to their suitability for migration, against a portfolio of available approaches, to understand the viability of undertaking migration for the particular client. The foregoing represents a high-level view; when going through the process, it is seen in Phase 0 that a candidate list is developed in step 408 and account-level data is obtained in step 410. The data warehouses 412, 414 include global asset configuration data warehouse (GACDW) 412 which is an asset configuration data warehouse that maintains configuration information about servers, at various levels of detail, across accounts, as well as SRM resource utilization data 414 (SRM is a tool which monitors and/or manages system resources), which provides utilization data on servers. As seen at 416, another source of data is empirical (e.g., questionnaire) data from the client engagement. At 418, carry out fast path screening wherein the data 412, 414, 416 is analyzed, and based on the above-described characterizations (e.g., source, target, and available techniques to effectuate changes), a quick pass is made through the data to identify "low-hanging fruit," i.e., workloads with minimal transformation requirements (by way of a non-limiting example, X86 workloads within the same data center, source environment of V Center Version 4.0, operating systems of Windows 2003 and newer, no application changes, only IP address changes). Of course, the source environment can be searched for in the database(s) 412 and/or 414 while information such as no application changes can be ascertained from the appropriate questionnaire data 416.

Figure 5:
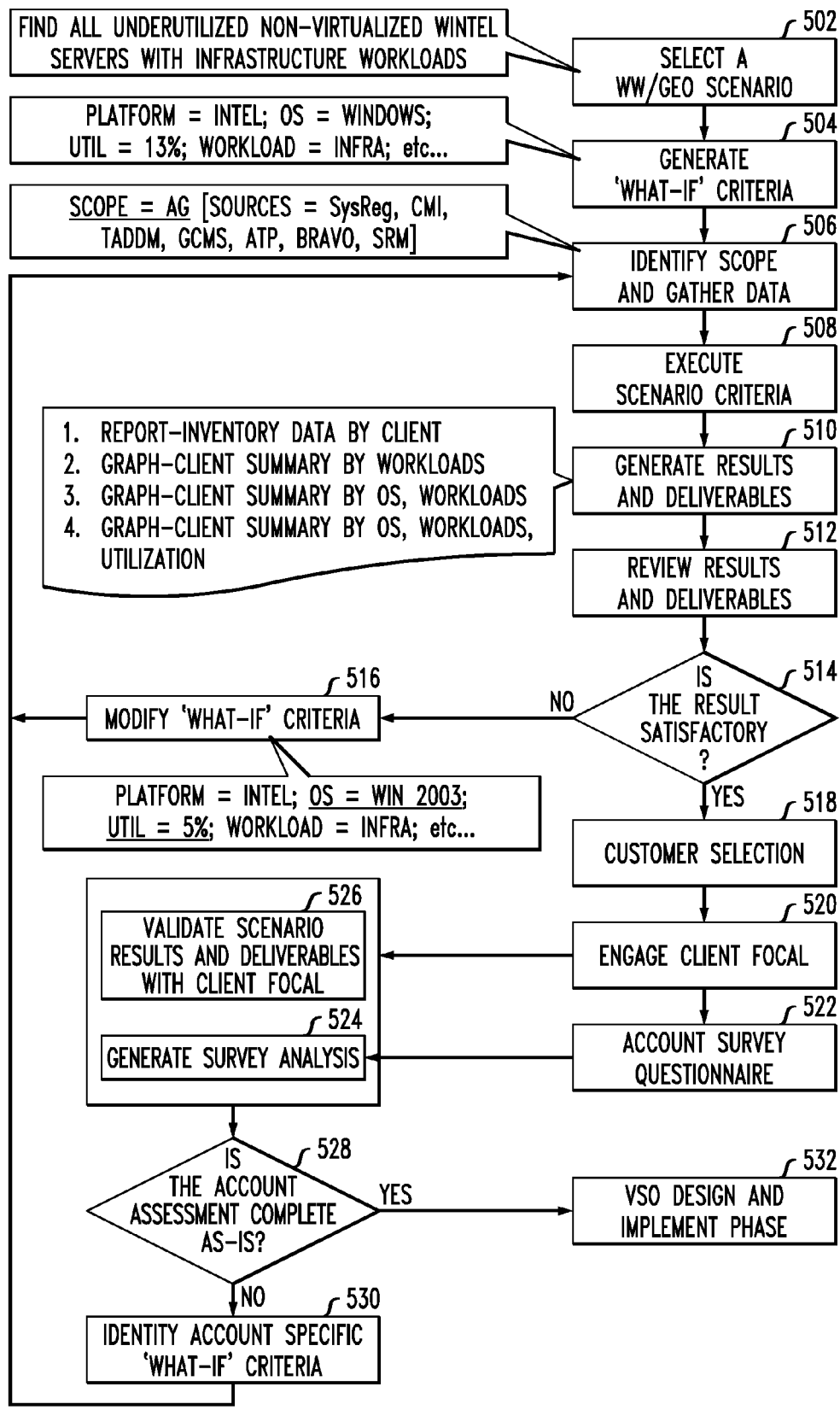
FIG. 5 shows a flow chart of exemplary method steps for carrying out step 418 in FIG. 4, according to an aspect of the invention.

By way of review and clarification, data store 412 includes configuration information, data store 414 has resource utilization data, and empirical data 416 includes data from the accounts, typically a characterization of the target environment. Step 418 includes conducting an initial analysis across all of the accounts that data is available for to find viable candidates. Additional detail is shown in FIG. 5, which presents a "zoom-in" on step 418, referred to as an opportunity investigation. In step 502, select a WW/Geo (worldwide/geographic) scenario (e.g., find all underutilized non-virtualized Wintel servers with infrastructure workloads). This can be implemented, for example, by running a query against database 412. In step 504, generate "what-if" criteria; for example, suppose the platform is Intel, the OS is Windows, the utilization is 13%, the workload is infra, and so on. In step 506, identify the scope and gather data; for example, the scope is AG and the sources include TADDM and SRM. In step 508, execute the query; in step 510, generate the report; in step 512, review the results; and in step 514, determine if the results are satisfactory.

If yes, proceed to customer selection at 518; engage the client at 520, and prepare an account survey questionnaire at 522. Validate the scenario results and deliverables with the client at 526, and generate the survey analysis at 524. Determine in decision block 528 if the assessment is complete. If yes, proceed to design and implementation at 532. If not, identify account-specific what-if criteria in 530 and return to steps 506 and 516. On the other hand, if step 514 yields a no, modify the what-if criteria in step 516 and proceed to step 506.

Figure 6:
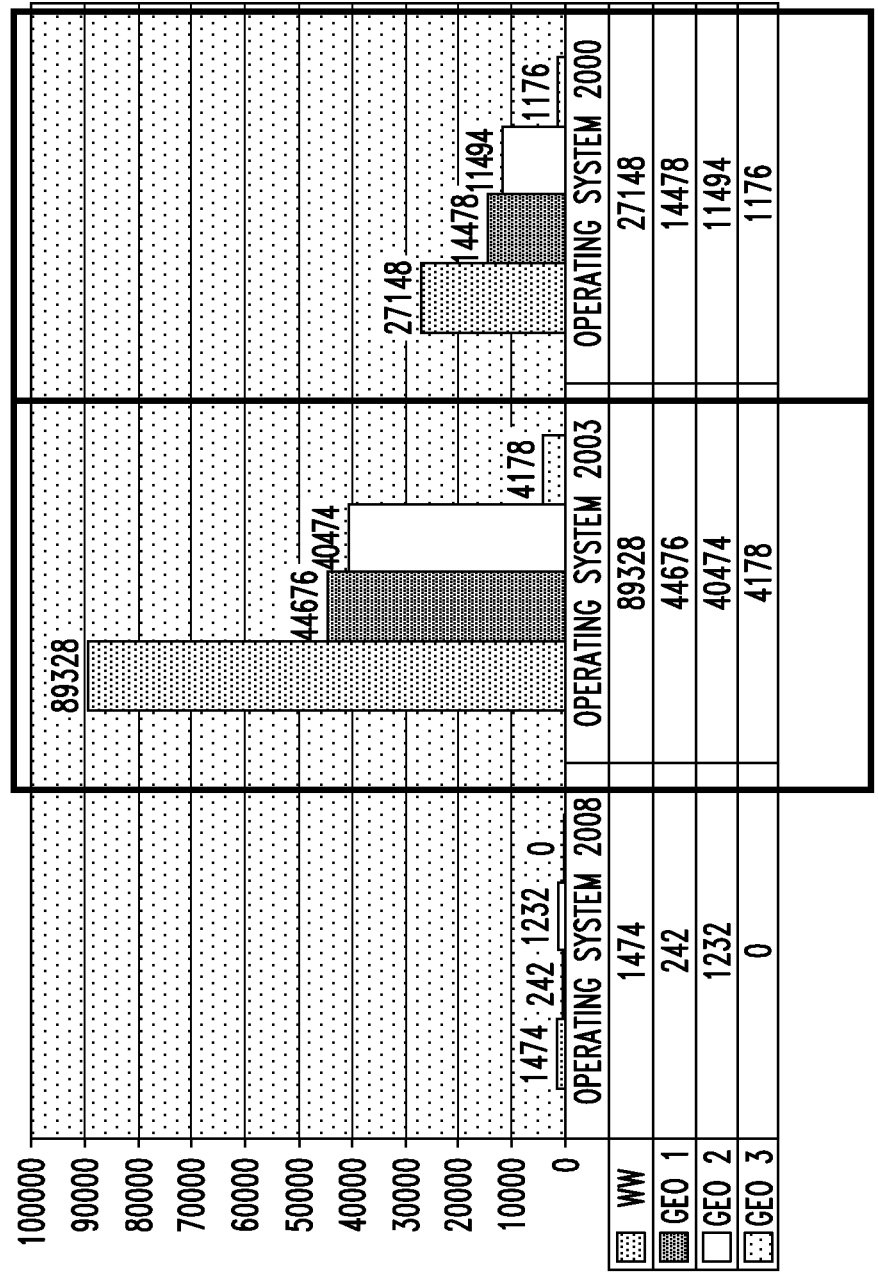
FIG. 6 shows exemplary data from data warehouse 412 in FIG. 4, according to an aspect of the invention.

FIG. 6 shows exemplary data extracted from data warehouse 412 including workloads by operating system level by geographical area. For each operating system, the bars are, from left to right, worldwide, geography 1, geography 2, and geography 3. Here, the OPERATING SYSTEM 2003 may have good candidate potential due to modernity (easier), while OPERATING SYSTEM 2000 may be a good candidate due to higher costs for support (more complex). The tabulated data shows the number of workloads in each geography by operating system, and is exemplary of the kind of data that can be considered in the step 418 of performing fast path screening. It will be appreciated that "2000," "2003," and "2008" represent years (versions) of the operating system and not reference characters.

Referring again to FIG. 4, in step 420 determine if good quality data exists for screening; i.e., are there enough answers available. For example, the account may not use SRM such that the utilization rate of the servers may not be known. Lack of good quality data is indicated by "NO" branch of block 420, wherein workloads are not considered for the fast-path process, as at 422. However, if good quality data is available, as indicated by "YES" branch of block 420, proceed to block 424, and determine if it would be appropriate to virtualize the workload(s) in a virtual server configuration. If not, as per the "NO" branch of block 424, no transformation is contemplated, as indicated at 426. If yes, prepare a business recommendation in step 428. With respect to decision block 424, in some instances, limitations may be imposed with respect to what workloads are to be considered, beyond the presence of good quality data, for example, in some instances, consider only X86 operating systems, within the same data center, without application transformations (i.e., no S5).

In step 428, approach the business or other client and present the analysis; if the client is interested, in steps 430, 432, and 434, prepare a statement of work, secure the client's signature, and proceed to VSO Phase 1 planning and design, in row 404. Row 404 includes two parallel paths, namely, a fast path for S1 and S2 cases, beginning at 436, and a non-fast path for non-fast path S1-S6 workloads, beginning at 438. In the fast path case, proceed to step 440 and develop a VSO design based on the reference architecture. In the non-fast path case, additional details may need to be teased out to accomplish, for example, middleware changes, OS upgrades, or the like, then discover application dependencies in step 442, carry out the above-discussed classification process in step 444, and so on. Once the selection of the approaches to be used has been completed, before migration can be carried out, the target infrastructure should be built (provisioned) as in Phase 2 at row 406. Using conventional techniques in Phase 2, in step 446, procure the hardware; in steps 448 and 450, configure the virtual environments; and in steps 452 and 454, prepare the system so it is ready to receive the workload(s) in step 456.

For completeness, in flow 404, note step 461, plan preparation; step 463, obtaining the decision to proceed; and step 465, infrastructure provisioning. Note also step 467, architecture development; step 469, plan preparation, and step 471, wherein the technical return on investment analysis is refined.

Phase 3 is next and has been discussed above; it includes a sequence of steps that should be followed to effectuate the migration. There will in general be Phase 3 processes for the S1 category, S2 category, S4 category, the S6 category, and so on. FIG. 7 shows Phase 3 for S6, in a non-limiting example, including the details of the approach being adopted based on the approach selected given the source environment configuration information and the target objectives.

One or more embodiments are applicable to cloud computing. Drivers can be developed that target a number of cloud architectures. For example, for S6, OS upgrades or cross-platform migrations such as System P to System Z, drivers can be supported for different architectures such as System P, System Z, X86, a cloud architecture, and so on. Thus, it is possible to specify the target as a certain kind of cloud and that will influence the kind of approach to be used. Some clouds have a registration capability which can be invoked based upon an initial image migration into the V center for that environment, followed by the registration. Consider the "S6" and "Registration" buttons as an example of the tooling supporting those two different options.

FIG. 7 shows a flow chart of exemplary method steps for carrying out migration phase 3 for type S6 migration of exemplary application server software. Note pre-migration preparation 791, migration 792, and post-migration transition to steady state at 793. In step 702, enable transformation tooling; in step 704, map desired targets to standard images in the library; in step 706, convert virtual instances to a target pool; in step 708 re-configure and/or fix up the virtual instances, and in step 710, install additional middleware packages. In step 712, configure the middleware; in step 714, deploy the application; in step 716, perform data migration if in-scope; in step 718, enable service management on the images, and in step 720, carry out application and/or user acceptance testing. Finally, in step 722, update the account database; in step 724, carry out service activation, in step 726, synchronize data if in scope; in step 728, note completion, and in step 730, shut down and de-commission the source.

FIG. 8 shows a flow chart of exemplary method steps for carrying out a new build of an application server using approach S6. Note phase 1 at 891, phase 3 automated at 892, and phase 3 manual at 893. In step 802, analyze and generate migration information; in step 804, deploy a so-called "golden image"; in step 806, configure middleware; in step 808, deploy the application; in step 810, remediate the application if needed; in step 812, test the application; and in step 814, transfer the configuration to a central repository. Furthermore, in step 816, deploy a so-called "golden image"; in step 818, configure middleware; in step 820, adapt the deployment and/or management scripts; in step 822, deploy the application; in step 824, remediate the application if needed; and in step 826, test the application.

FIG. 9 shows at least a portion of the logic of FIG. 1 in tabular form.

Figure 10:
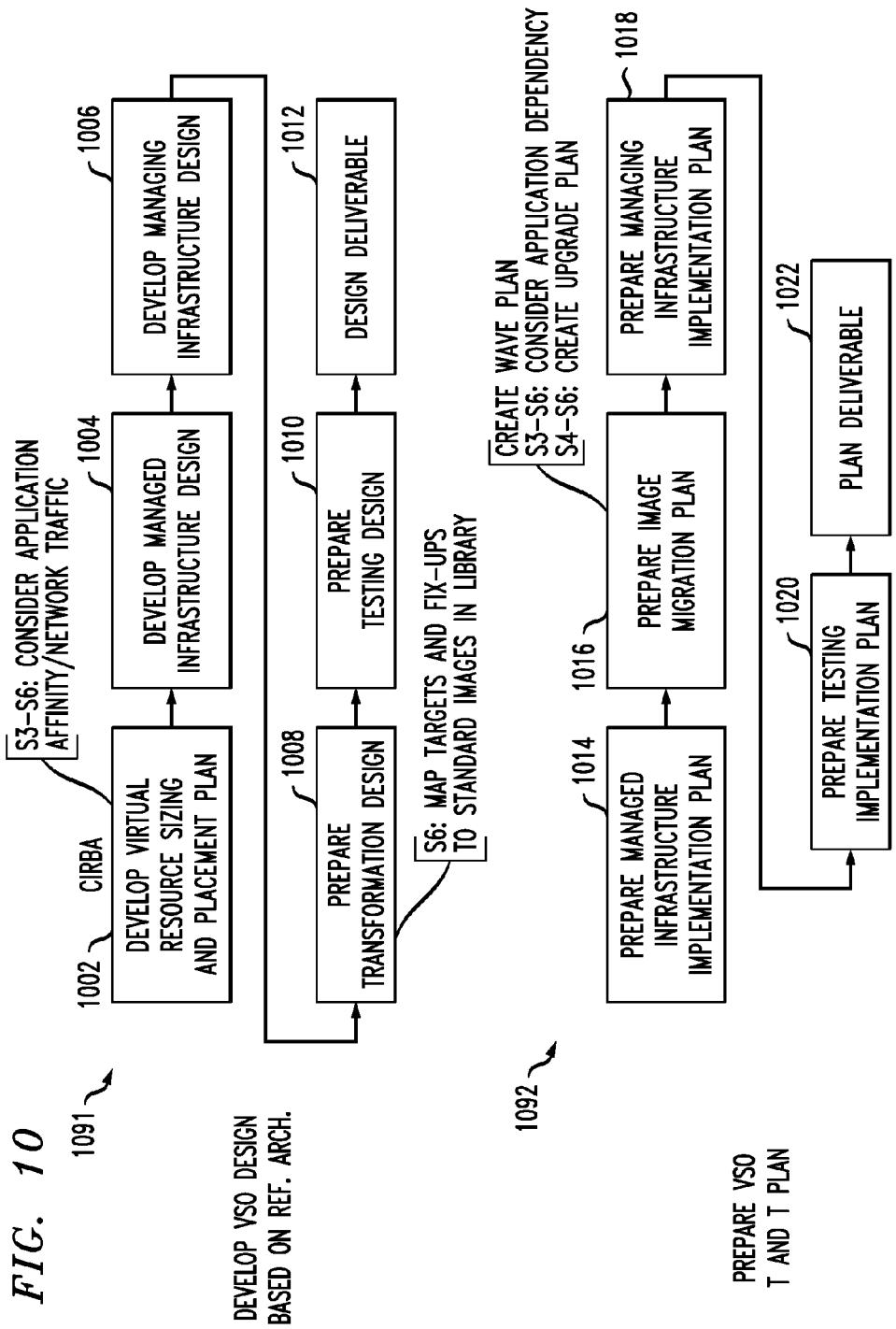
FIG. 10 shows a flow chart of exemplary generic method steps for carrying out migration phase 1 for type S1-S6 migration of any desired application, according to an aspect of the invention.

FIG. 10 shows a flow chart of exemplary generic method steps for carrying out migration phase 1 for type S1-S6 migration of any desired application. Note aspect 1091, developing a design based on a reference architecture, and aspect 1092, preparing the plan. In particular, in step 1002, develop a virtual resource sizing and placement plan; in step 1004, develop a managed infrastructure design; in step 1006, develop a managing infrastructure design; in step 1008, prepare a transformation design; in step 1010, prepare testing design, and in step 1012, note the design deliverable. Furthermore, in step 1014, prepare a managed infrastructure implementation plan; in step 1016, prepare an image migration plan; in step 1018, prepare a managing infrastructure implementation plan; in step 1020, prepare a testing implementation plan, and in step 1022, note the plan deliverable.

Figure 11:
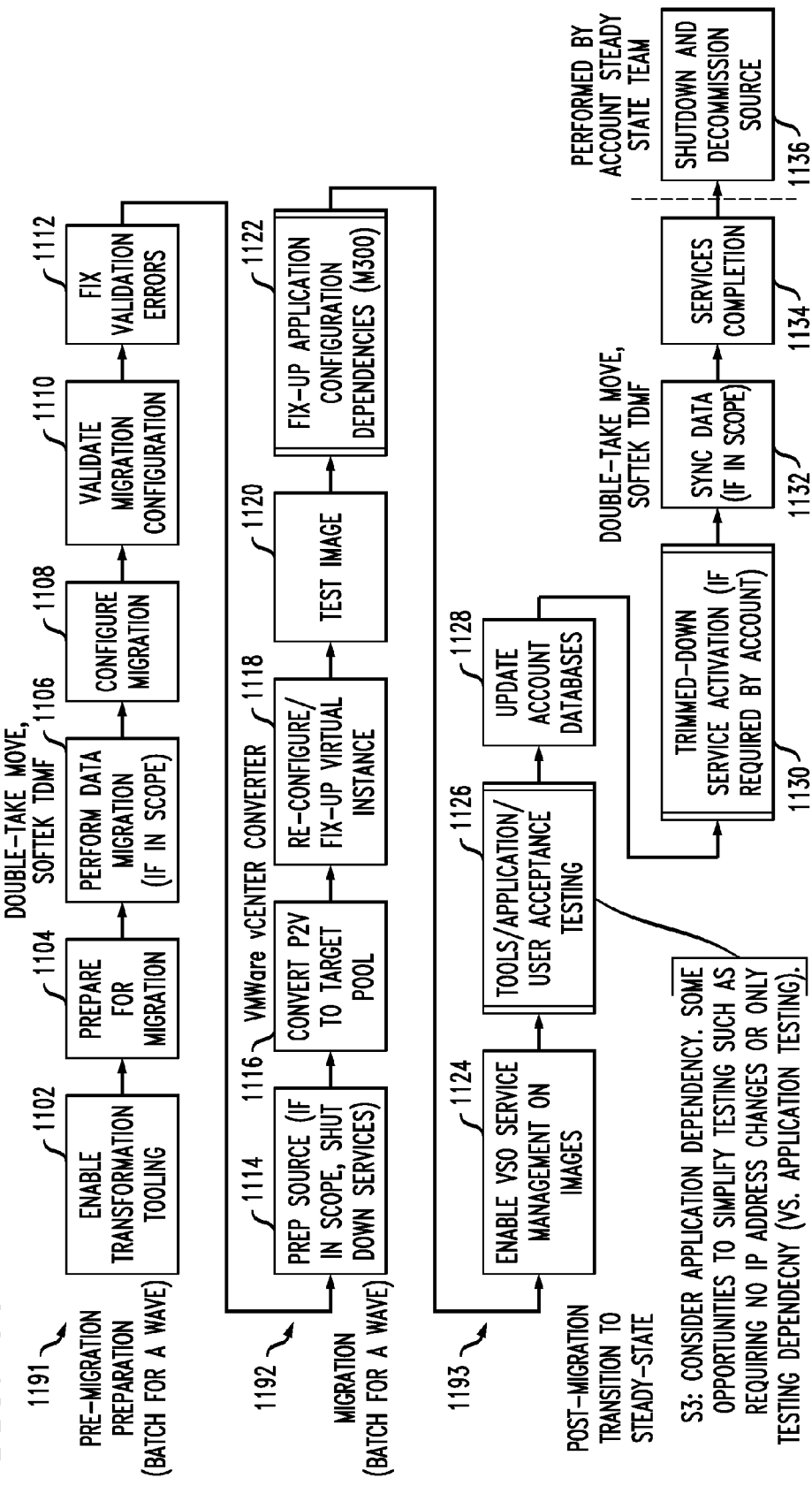
FIG. 11 shows a flow chart of exemplary method steps for carrying out migration phase 3 for type S1-S3 migration of any desired application, according to an aspect of the invention.

FIG. 11 shows a flow chart of exemplary method steps for carrying out migration phase 3 for type S1-S3 migration of any desired application. Note pre-migration preparation 1191, migration 1192, and post-migration 1193. In step 1102; enable transformation tooling; in step 1104, prepare for migration; in step 1106, perform data migration of the same is in-scope; in step 1108, configure the migration; in step 1110, validate the migration configuration, and in step 1112, fix any validation errors. Furthermore, in step 1114, prepare the source (if in scope, shutting down the services); in step 1116, convert to an appropriate target pool; in step 1118, reconfigure and/or fix up the virtual instance(s); in step 1120, test the image(s), and in step 1122, fix up any application configuration dependencies. Even further, in step 1124, enable service management on the images; in step 1126, carry out tools and/or application user acceptance testing; in step 1128, upgrade account databases; in step 1130, carry out any required trimmed-down service activation; in step 1132, synch the data, if in-scope, and in step 1134, completion is achieved, followed by shut-down and decommissioning of the source in step 1136.

Note with respect to step 1122 that there are different fix-ups (as opposed to upgrades) for different middleware. Some instances use the IBM Blue Horse automation package for middleware fix up.

Figure 12:
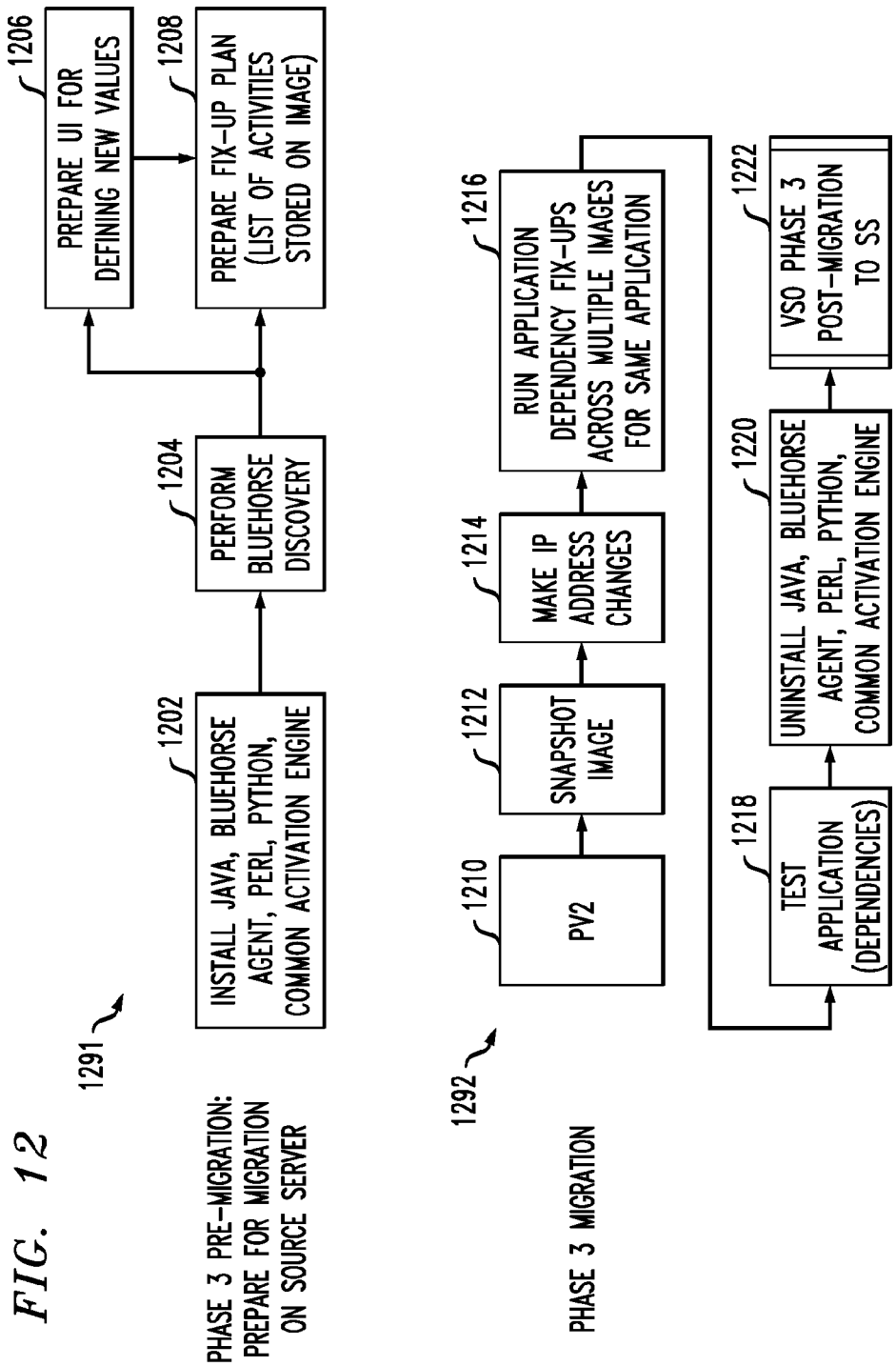
FIG. 12 shows a flow chart of exemplary method steps for carrying out step 1122 of FIG. 11, according to an aspect of the invention.

FIG. 12 shows a flow chart of exemplary method steps for carrying out step 1122 of FIG. 11. Note pre-migration aspect 1291 and phase 3 migration aspect 1292. In step 1202, install appropriate items such as Java, the aforementioned Blue Horse agent, Perl, Python, common activation engine, and the like. In step 1204, perform discovery, such as with the aforementioned Blue Horse tool. In step 1206, prepare the user interface for defining new values, and in step 1208, prepare a fix-up plan (a list of activities stored on an image). In step 1210, perform physical-to-virtual using one of the many off-the-shelf products; in step 1212, obtain a snapshot image, and in step 1214 make any required IP address changes. Furthermore, in step 1216, run application dependency fix-ups across multiple images for the same application. In step 1218, test the application dependencies. In step 1220, uninstall the items installed in step 1202; then, note post-migration aspects at 1222.

Figure 13:
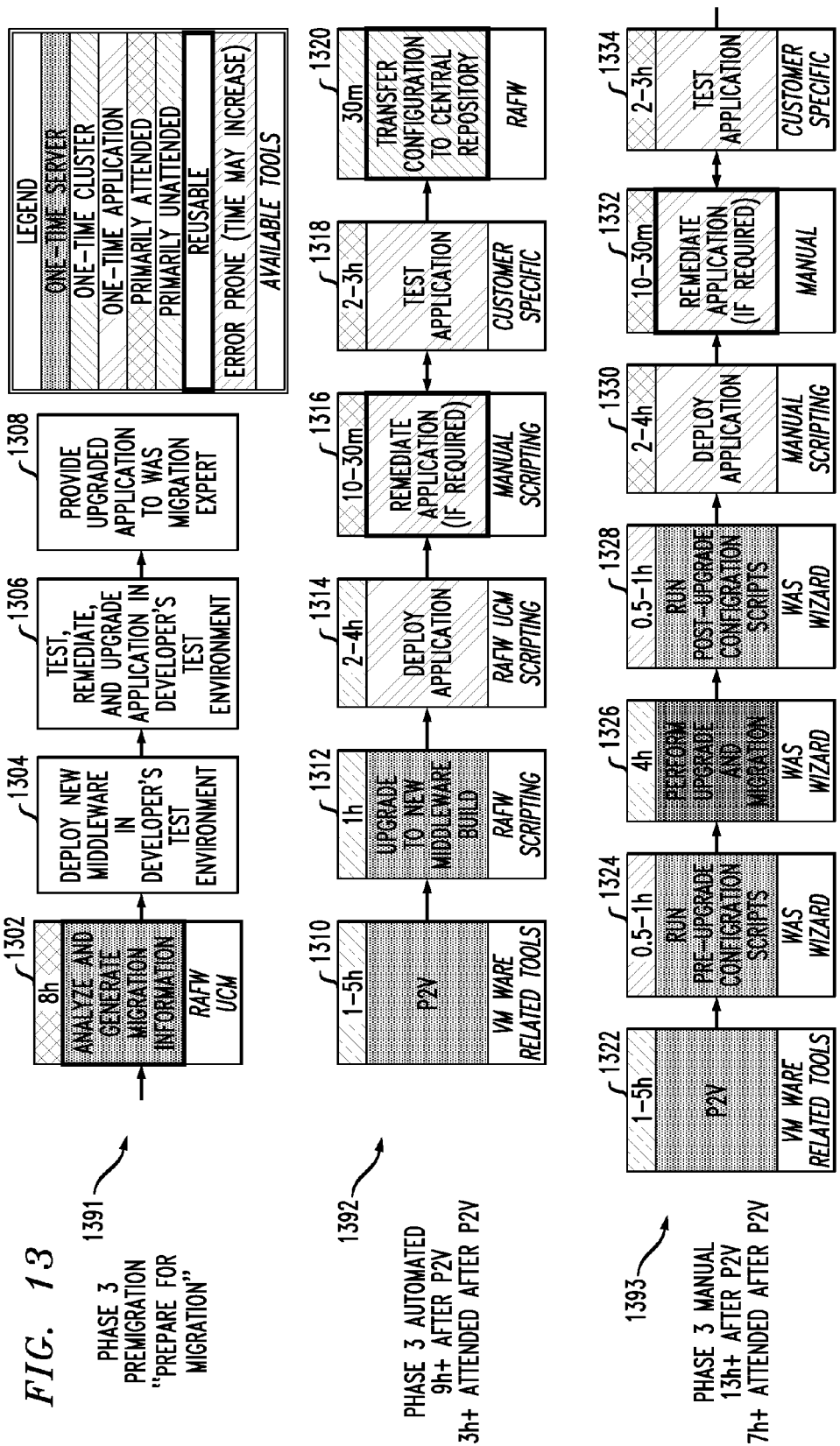
FIG. 13 shows a flow chart of exemplary method steps for carrying out approach S4 for an application server software upgrade, according to an aspect of the invention.

FIG. 13 shows a flow chart of exemplary method steps for carrying out approach S4 for an application server software upgrade. Note phase 3 pre-migration at 1391, phase 3 automated at 1392, and phase 3 manual at 1393. In step 1302, analyze and generate migration information; in step 1304, deploy new middleware in the development and test environment; in step 1306, carry out test, remediation, application upgrade in the developer's test environment; and in step 1308, provide the upgraded application to the application server software migration expert. In step 1310, perform physical-to-virtual using one of the many off-the-shelf products; in step 1312, upgrade to the new middleware build; in step 1314, deploy the application; in step 1316, remediate the application if needed; in step 1318, test the application; and in step 1320, transfer the configuration to a central repository. Furthermore, in step 1322, perform physical-to-virtual using one of the many off-the-shelf products; in step 1324, run pre-upgrade configuration scripts; in step 1326, perform upgrade and migration; in step 1328, run post-upgrade configuration scripts; in step 1330, deploy the application; in step 1332, remediate the application if needed; and in step 1334, test the application.

Figure 14:
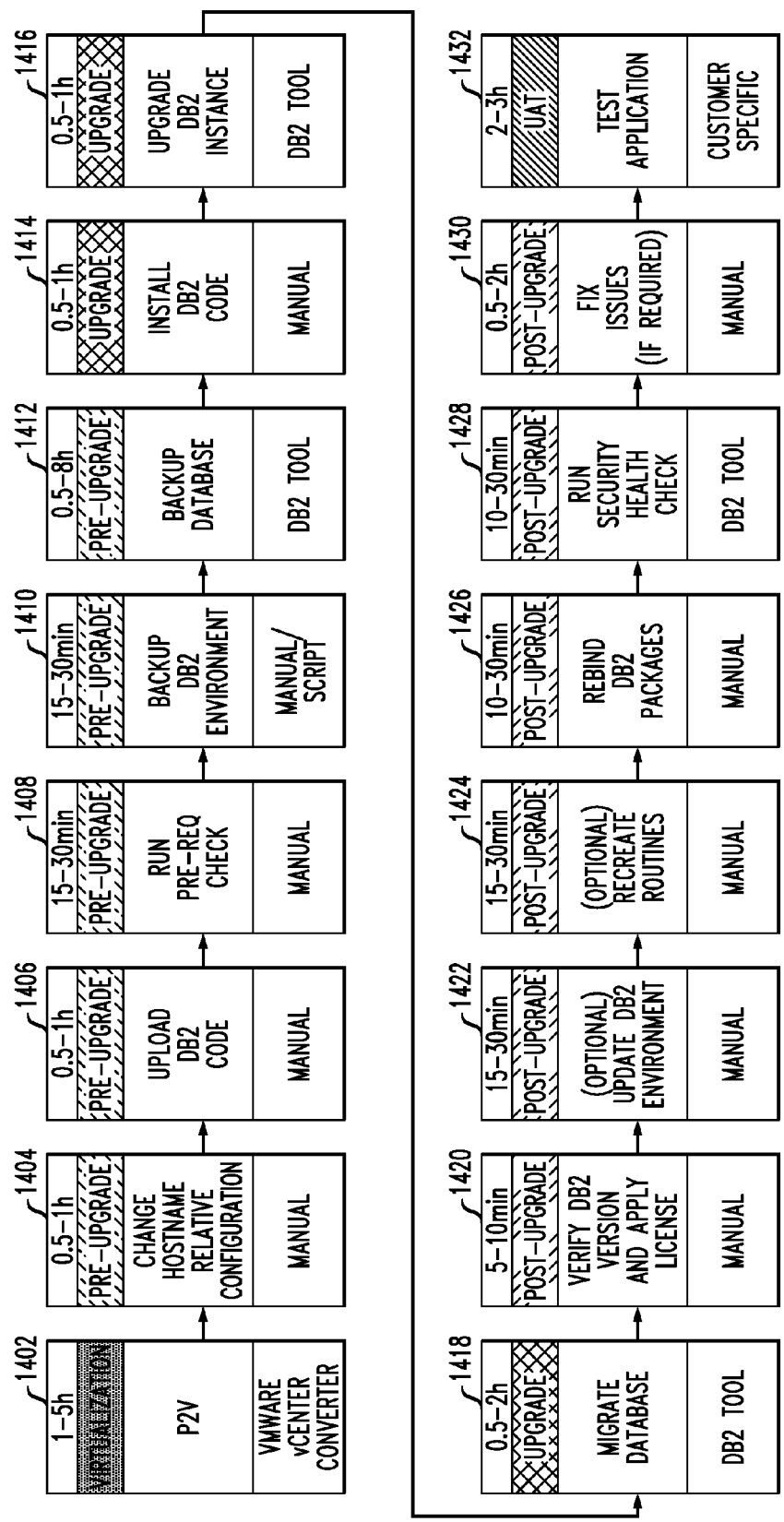
FIG. 14 shows a flow chart of exemplary method steps for carrying out phase 3 for approach S4 for a database software upgrade and data migration, according to an aspect of the invention.

FIG. 14 shows a flow chart of exemplary method steps for carrying out phase 3 for approach S4 for a database software upgrade and data migration (e.g., DB2, but also representative of techniques for other types of databases). In step 1402, perform physical-to-virtual using one of the many off-the-shelf products; in step 1404, change the hostname relative configuration; in step 1406, upload the DB2 code; in step 1408, run a prerequisite check; in step 1410, backup the DB2 environment; in step 1412, back up the database; in step 1414, install the DB2 code; and in step 1416, upgrade the DB2 code. Furthermore, in step 1418, migrate the database; in step 1420, verify the version and apply the license; in step 1422, optionally update the DB2 environment; in step 1424, optionally recreate any pertinent routines; in step 1426, rebind the DB2 packages; in step 1428, run a security health check; in step 1430, fix any issues, if required; and in step 1432, test the application.

Figure 15:
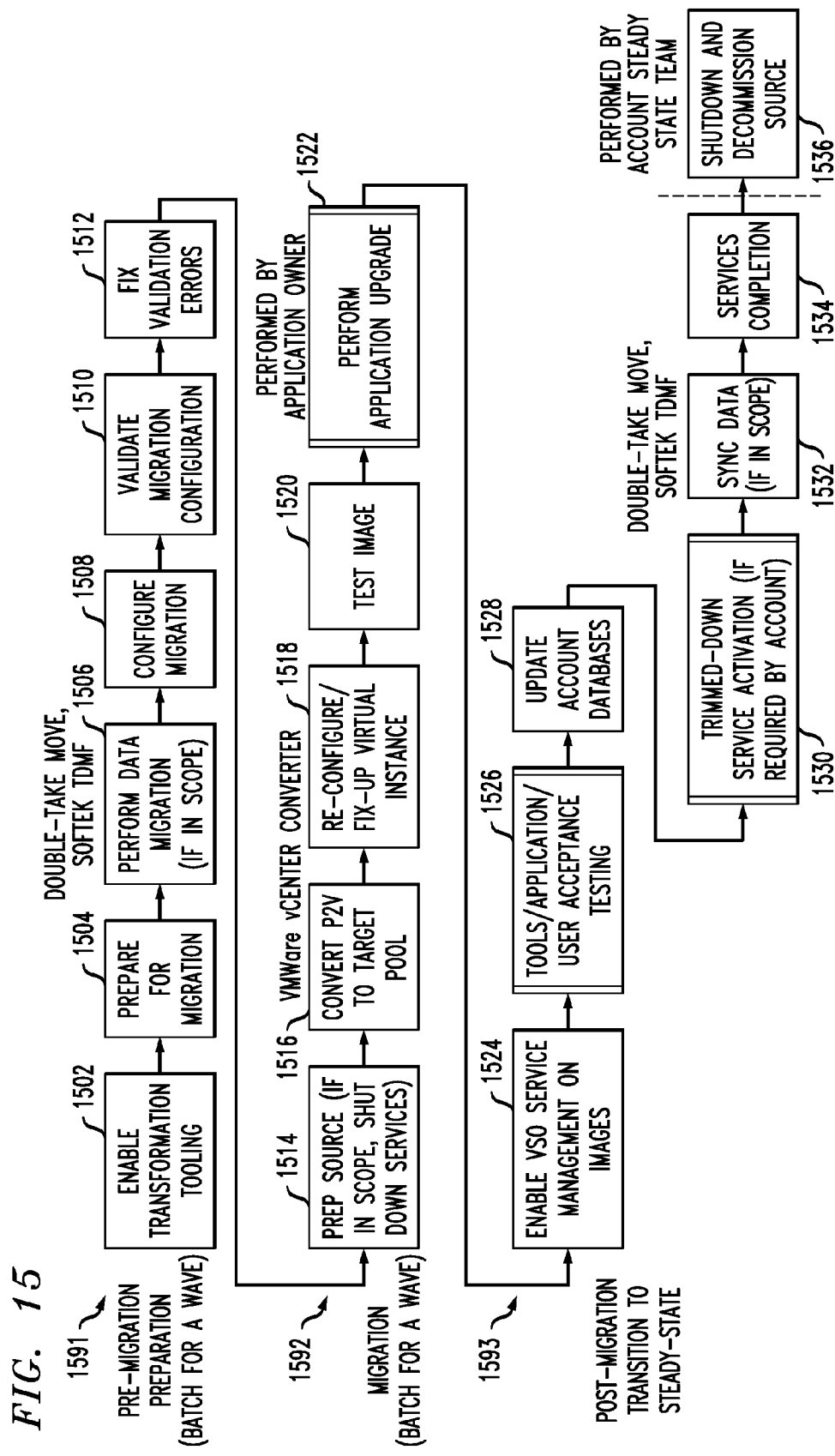
FIG. 15 shows a flow chart of exemplary method steps for carrying out migration phase 3 for type S5 migration of any desired application, according to an aspect of the invention.

FIG. 15 shows a flow chart of exemplary method steps for carrying out migration phase 3 for type S5 migration of any desired application. Note pre-migration preparation 1591, migration 1592, and post-migration 1593. In step 1502, enable transformation tooling; in step 1504, prepare for migration; in step 1506, perform data migration if the same is in-scope; in step 1508, configure the migration; in step 1510, validate the migration configuration, and in step 1512, fix any validation errors. Furthermore, in step 1514, prepare the source (if in scope, shutting down the services); in step 1516, convert to an appropriate target pool; in step 1518, reconfigure and/or fix up the virtual instance(s); in step 1520, test the image(s), and in step 1522, perform the application upgrade. Even further, in step 1524, enable service management on the images; in step 1526, carry out tool and/or application user acceptance testing; in step 1528, update account databases; in step 1530, carry out any required trimmed-down service activation; in step 1532, synchronize the data, if in-scope, and in step 1534, completion is achieved, followed by shut-down and decommissioning of the source in step 1536.

Figure 16:
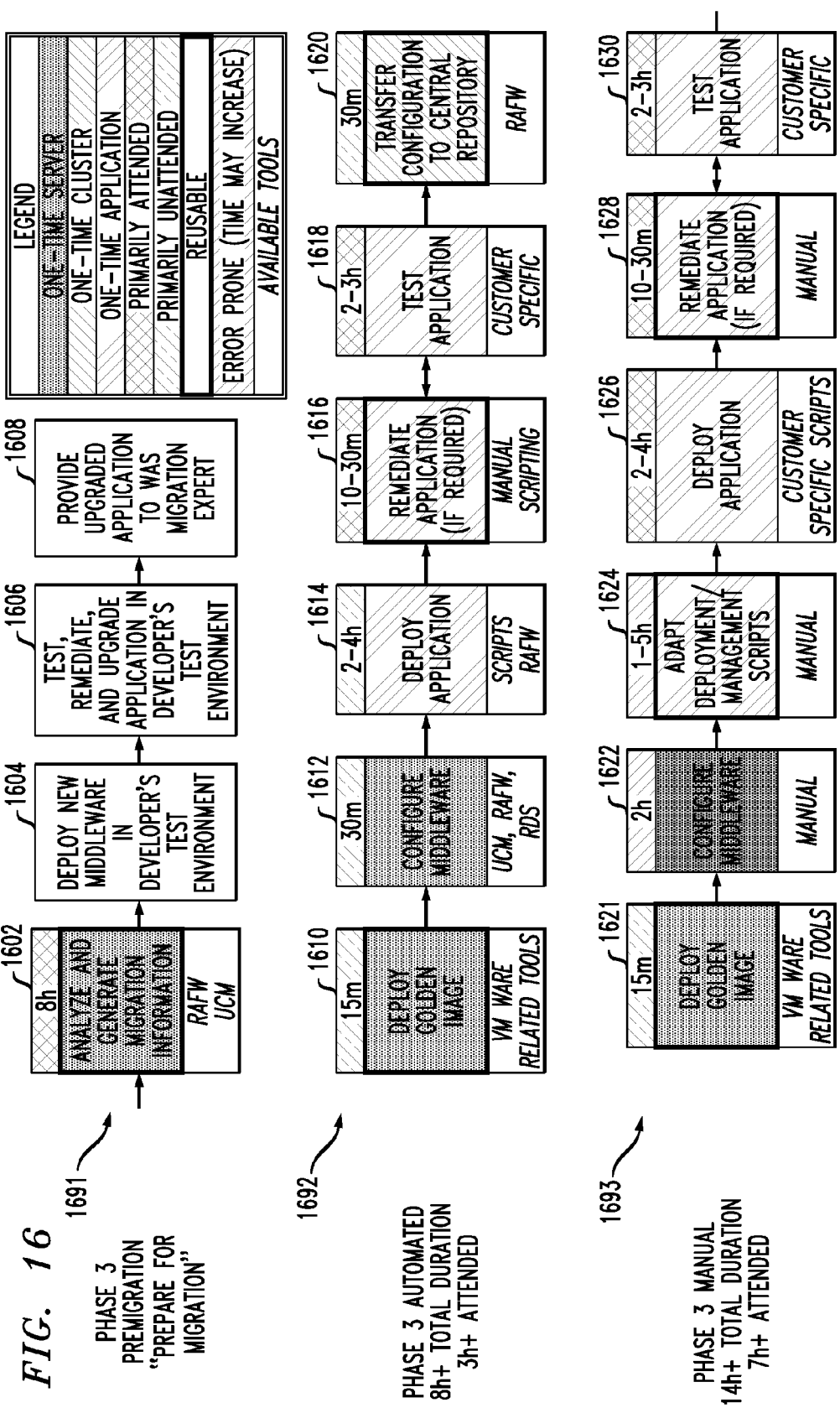
FIG. 16 shows a flow chart of exemplary method steps for carrying out a new server build and an application migration for application server software, according to an aspect of the invention.

FIG. 16 shows a flow chart of exemplary method steps for carrying out a new server build and an application migration for application server software. Note phase 3 pre-migration at 1691, phase 3 automated at 1692, and phase 3 manual at 1693. In step 1602, analyze and generate migration information; in step 1604, deploy new middleware in the developer's test environment; in step 1606, carry out test, remediation, application upgrade in the developer's test environment; and in step 1608, provide the upgraded application to the application server software migration expert. In step 1610, deploy the "golden image"; in step 1612, configure the middleware; in step 1614, deploy the application; in step 1616, remediate the application if needed; in step 1618, test the application; and in step 1620, transfer the configuration to a central repository. Furthermore, in step 1621, deploy the "golden image"; in step 1622, configure the middleware; in step 1624, adapt deployment and/or management scripts; in step 1626, deploy the application; in step 1628, remediate the application if needed; and in step 1630, test the application.

Figure 17:
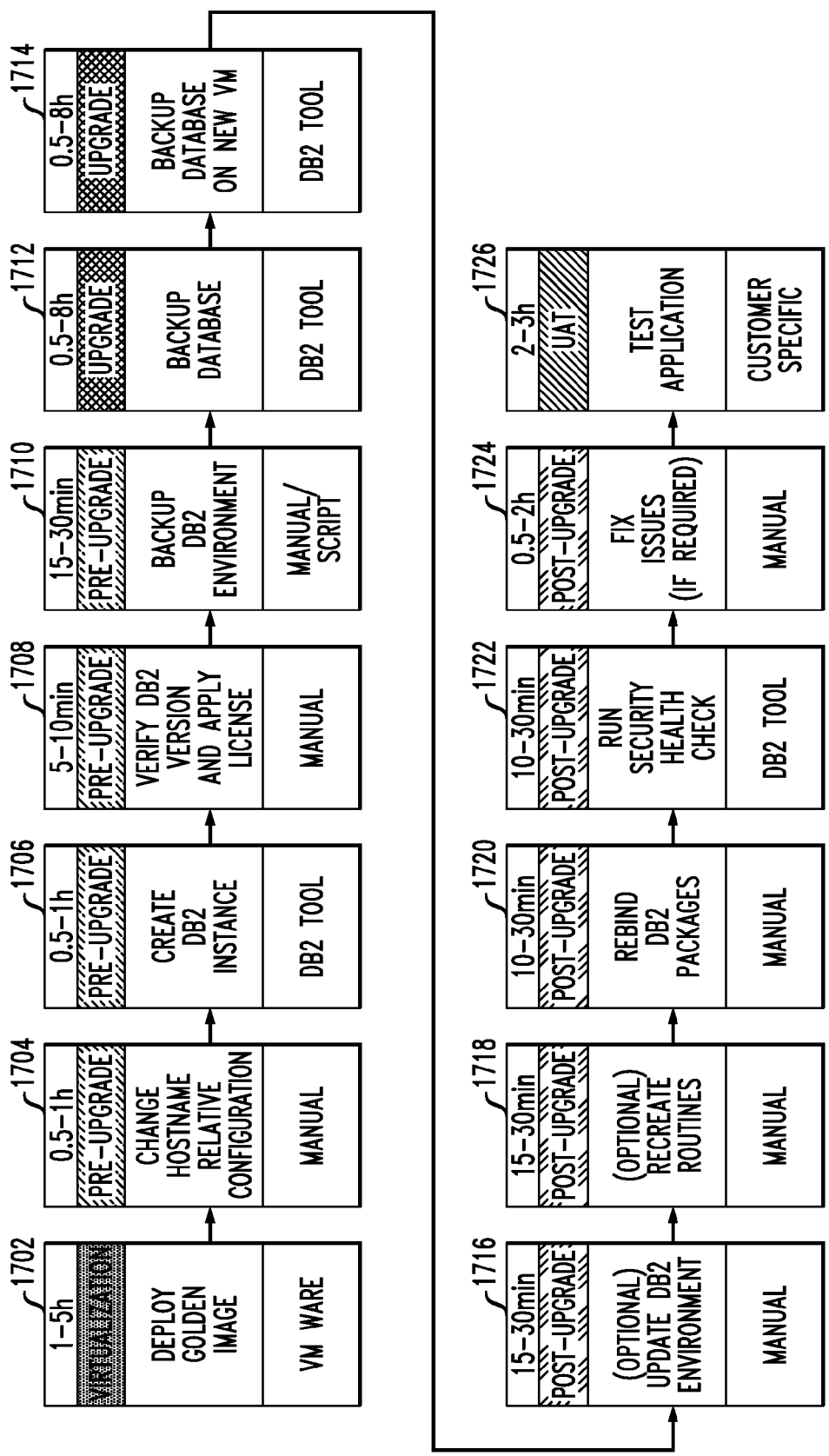
FIG. 17 shows a flow chart of exemplary method steps for carrying out phase 3 of scenario S6 for a new build of database software with data migration, according to an aspect of the invention.

FIG. 17 shows a flow chart of exemplary method steps for carrying out phase 3 of scenario S6 for a new build of database software with data migration. In step 1702, deploy a "golden image"; in step 1704, change the hostname relative configuration; in step 1706, create a DB2 instance; in step 1708, verify the version and apply the license; in step 1710, backup the DB2 environment; in step 1712, back up the database; in step 1714, restore the database on the new virtual machine; and in step 1716, upgrade the DB2 environment. Furthermore, in step 1718, optionally recreate any pertinent routines; in step 1720, rebind the DB2 packages; in step 1722, run a security health check; in step 1724, fix any issues, if required; and in step 1726, test the application.

Figure 18:
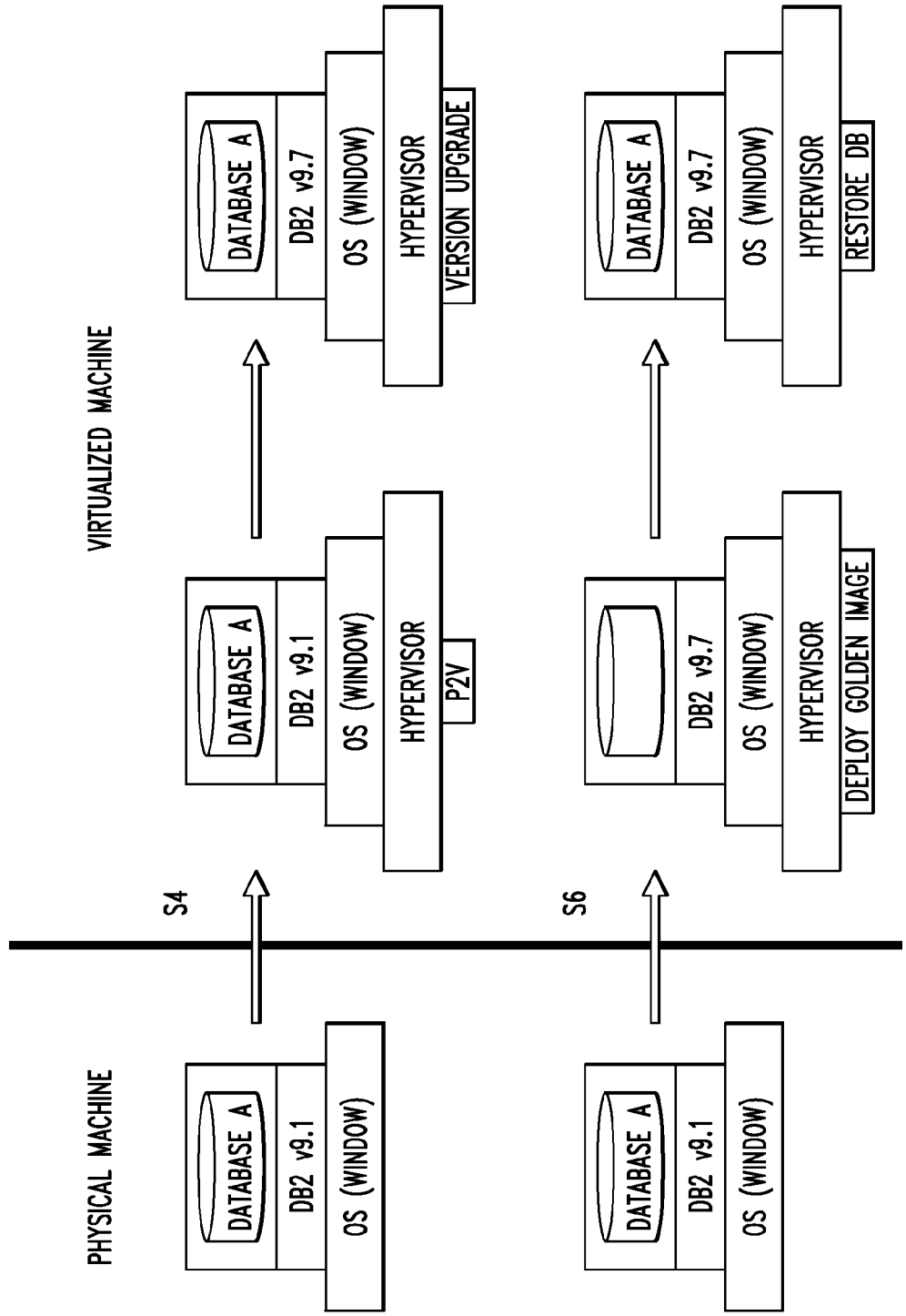
FIG. 18 shows exemplary type S4 and S6 database migration, according to an aspect of the invention.

FIG. 18 shows exemplary type S4 and S6 database migration, according to an aspect of the invention; FIG. 18 provides pictorial clarification, at a high level, of FIGS. 14 (S4) and 17 (S6).

FIGS. 19-22 show an exemplary sequence of steps for database system upgrade and database migration, according to an aspect of the invention. FIGS. 19-22 present exemplary detailed commands to execute to fulfill particular activities in question, for illustrative purposes. For example, FIG. 19 illustrates step 1422. FIG. 20 illustrates steps 1412 and 1418.

Given the discussion thus far, it will be appreciated that, in general terms, an exemplary method, according to an aspect of the invention, includes the step of obtaining data characterizing a source computing environment having at least one hardware resource and at least one workload. As used herein, the term "workload" is equivalent to the term "application." In some cases, this step is carried out by a suitable discovery module executing on at least one hardware processor. A discovery module should be broadly construed in this context to cover functionality such as described with respect to elements 3104, 3242, 3244, 3248, 3246, 3208, and/or 3222. An additional step includes obtaining a specification of a target computing environment to which the at least one workload is to be migrated in a migration. In some cases, this step is carried out by a suitable target analysis module executing on the at least one hardware processor. A target analysis module should be broadly construed in this context to cover functionality such as described with respect to elements 3212, 3226, 3110, and/or 3240. Furthermore, this step broadly includes the case of changing to different versions of the applications and even to a different application entirely—say from "ACME" database to the DB2 database.

An additional step includes, based on the data characterizing the source computing environment and the specification of the target computing environment, categorizing the migration into one of a plurality of categories. In some cases, this step is carried out by a suitable rules engine module executing on the at least one hardware processor. A rules engine module should be broadly construed in this context to cover functionality such as described with respect to element 3112 and related functionality as described herein. A still further step includes specifying the migration in accordance with a migration technique selected based on the categorizing step. In some cases, this step is carried out by a suitable approach selection module executing on the at least one hardware processor. An approach selection module should be broadly construed in this context to cover functionality such as described with respect to elements 3212, 3226 and related functionality as described herein.

In some cases, the categorizing of the migration includes determining whether an operating system version upgrade is required, as in decision block 104. In some cases, the categorizing of the migration further includes determining whether at least one of a middleware upgrade and an application upgrade is required, as at 106, 108. Furthermore, in some instances, the categorizing of the migration further includes determining whether an internet protocol address change is required, as at 110.

Even further, in some cases, the categorizing of the migration even further includes categorizing the migration into a first category (e.g., S1) if the operating system version upgrade is not required, the at least one of a middleware upgrade and an application upgrade is not required, and the internet protocol address change is not required; categorizing the migration into a second category (e.g., S2 or S3) if the operating system version upgrade is not required, the at least one of a middleware upgrade and an application upgrade is not required, and the internet protocol address change is required; and, if the operating system version upgrade is not required, and the at least one of a middleware upgrade and an application upgrade is required, determining whether a new server build is required. Furthermore, if the operating system version upgrade is not required, and the at least one of a middleware upgrade and an application upgrade is required, and the new server build is not required, categorize the migration into a third category (e.g., S4 or S5). Even further, if at least one of: (i) the operating system version upgrade is not required, and the at least one of a middleware upgrade and an application upgrade is required, and the new server build is required; and (ii) the operating system version upgrade is required, categorize the migration into a fourth category (e.g., S6 or S7).

In some cases, in the step of obtaining the specification of the target computing environment, the target computing environment includes a virtualized server environment, and the step of carrying out the migration includes migrating the workloads to the virtualized server environment. See FIG. 25 physical servers in layer 60 with a hypervisor running on top to host virtual servers in layer 62.

Figure 23:
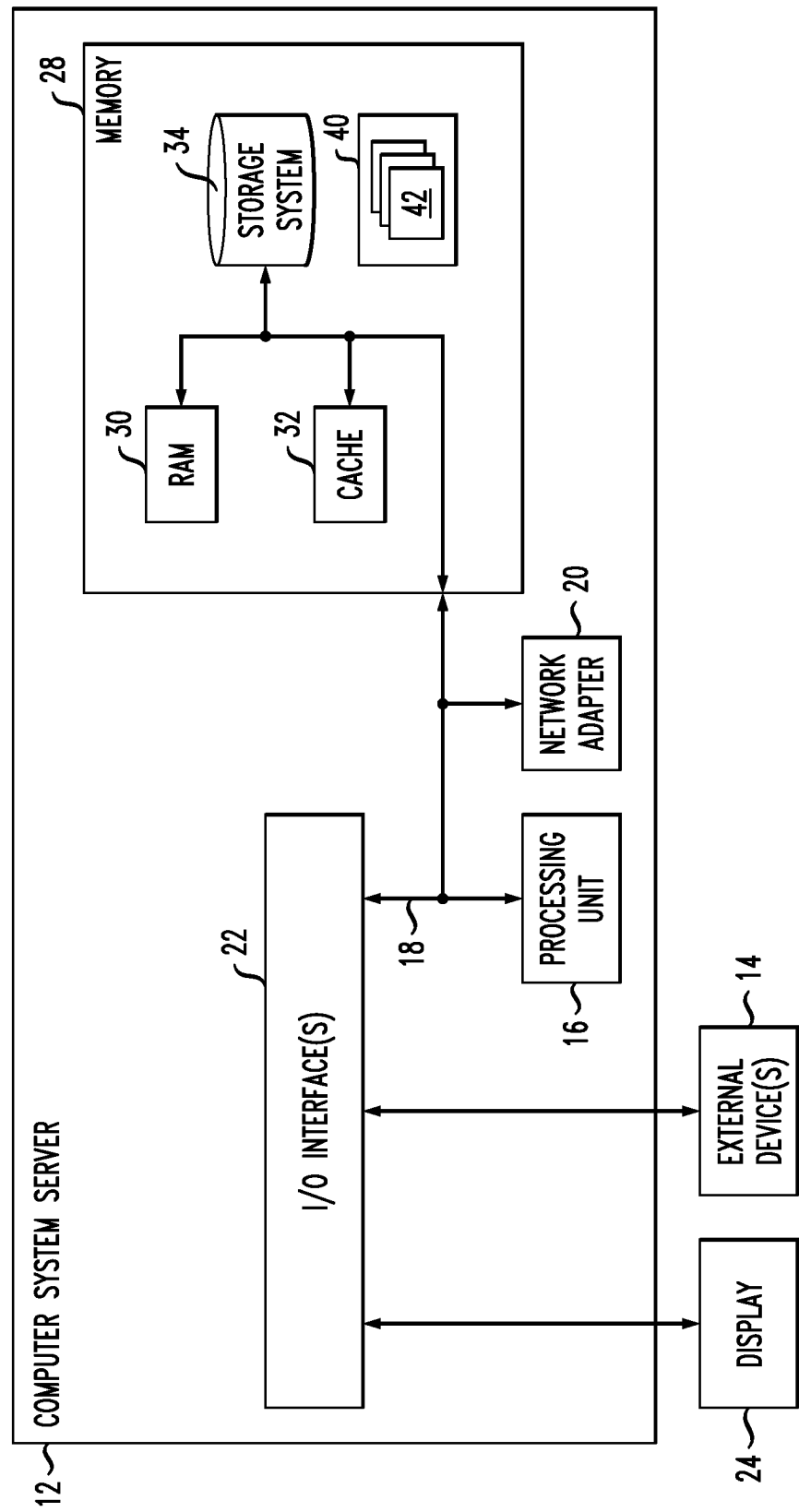
FIG. 23 depicts a cloud computing node according to an embodiment of the present invention, and is also generally representative of a computer system that may be useful in implementing one or more aspects and/or elements of the invention.
Figure 24:
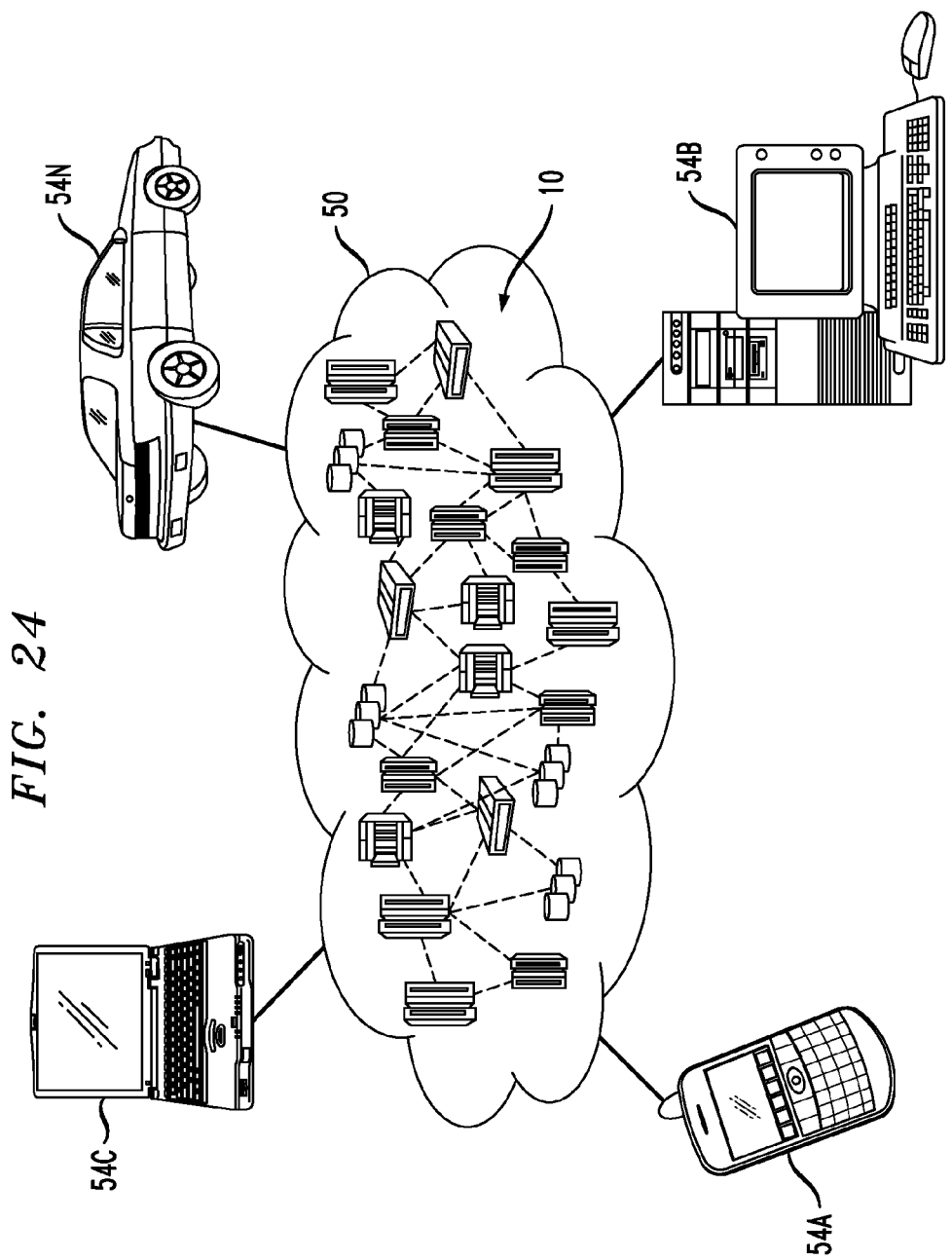
FIG. 24 depicts a cloud computing environment according to an embodiment of the present invention.
Figure 25:
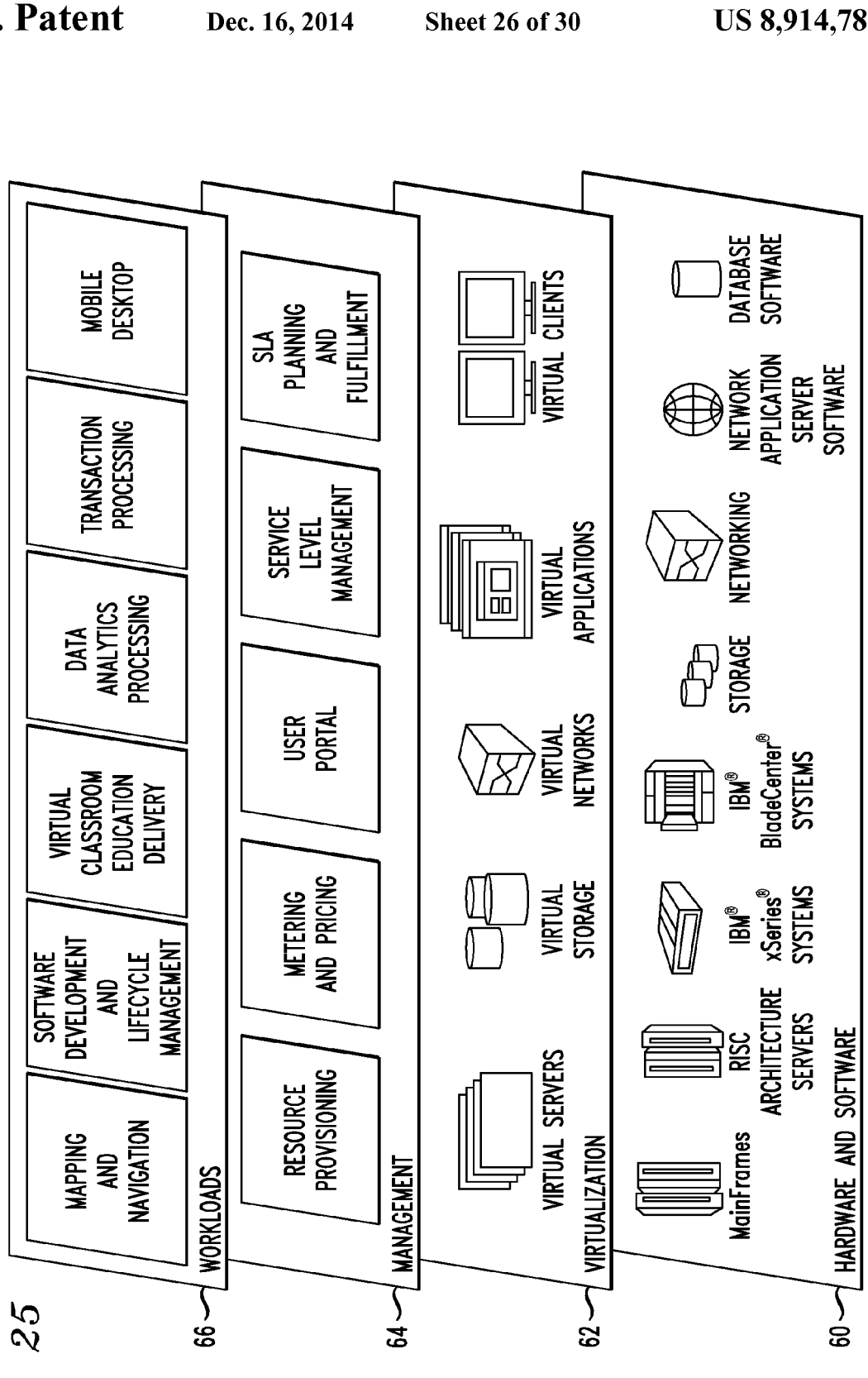
FIG. 25 depicts abstraction model layers according to an embodiment of the present invention.

In some instances, in the step of obtaining the specification of the target computing environment, the target computing environment is a cloud computing environment, as described with respect to FIGS. 23-25, and the step of carrying out the migration includes migrating the workloads to the cloud computing environment.

In some instances, an optional additional step includes actually carrying out the migration in accordance with the selected migration technique.

As shown in FIG. 28, in some cases, the specifying step includes specifying the migration as a migration approach 3310 which drives a sequence of migration steps 3312. The migration approach in turn is dictated by a plurality of rules 3302 based on the data characterizing the source computing environment 3304, the specification of the target computing environment 3306, and a database 3308 including rules specifications.

The set of discovered data from questionnaires and discovery tooling can include, for example, operating system (OS), server, location, and similar attributes.

Thus, one or more instances select the type of migration approach based on the category (e.g., S1-S6) and apply these approaches in a systematic way to create the virtualized server or other target environment. There is appropriate linkage between the discovered data, the decision logic for the classification and the approaches used (FIGS. 26-30, e.g.). Note that the S1-S6 representations can be refined if desired. In one sense, a term such as "S6" is a collective pronoun in the sense that there is an S6 for WAS, an S6 for DB2, an S6 for SQL, and so on. Furthermore, in practice, there are really not six rules, there are hundreds of rules, because every combination of things is significant. For example, in step 3510, consider DB2 version 9.5 and seek to upgrade to 9.7—is there a rule to go from 9.5 to 9.7? If yes, use it. Rules are encoded by a human expert in one or more embodiments.

In some cases, an additional step includes providing a system, wherein the system includes distinct software modules. Each of the distinct software modules is embodied on a computer-readable storage medium, and the distinct software modules include a discovery module, a target analysis module, a rules engine module, and an approach selection module, as described above.

In another aspect, as per FIG. 29, an exemplary method includes obtaining configuration data indicative of a plurality of potential source computing environments appropriate for migration, as at 3402; obtaining application assessment data, as at 3404; selecting search criteria, as at 3406; and displaying results based on at least the application assessment data and searching with the search criteria, as at 3408. Furthermore, additional steps include obtaining a selection of at least one of the potential source computing environments as indeed being appropriate for the migration, as at 3410 (YES, else go back to 3406); and storing the selection in a target list, as at 3412.

In such instances, an additional step can include providing a system, wherein the system includes distinct software modules. Each of the distinct software modules is embodied on a computer-readable storage medium, and the distinct software modules comprise a configuration management service module (e.g., 3244), an application assessment service module (e.g., 3246), an opportunity selection service module (e.g., 3210, 3224), a data store module 3206, and a user interface module 3202. In such cases, the obtaining of the configuration data is carried out by the configuration management service module executing on at least one hardware processor; the obtaining of the application assessment data is carried out by the application assessment service module executing on the at least one hardware processor; the selecting of the search criteria is carried out by the opportunity selection service module executing on the at least one hardware processor; the displaying of the results and the obtaining of the selection are carried out by the user interface module executing on the at least one hardware processor; and the storing includes storing the target list using the data store module.

Exemplary Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud environments may correspond to source and/or target environments.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 23, a schematic of an example of a cloud computing node is shown. The system of FIG. 23 is also representative of servers or other general purpose computers that may be used in environments other than cloud computing environments. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 23, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 24, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 24 are intended to be illustrative only and that computing nodes 10 and cloud computing environment 50 can communicate with any type of computerized device over any type of network and/or network addressable connection (e.g., using a web browser).

Referring now to FIG. 25, a set of functional abstraction layers provided by cloud computing environment 50 (FIG. 24) is shown. It should be understood in advance that the components, layers, and functions shown in FIG. 25 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 23, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" per se includes a physical data processing system (for example, system 12 as shown in FIG. 23) running a server program. It will be understood that such a physical server may or may not include a display and keyboard and that when the software is to be referred to, terminology such as "application server software is software" is employed.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Scripting languages such as Perl and PHP can be used in one or more embodiments. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, any or the modules or sub-modules depicted in FIGS. 26-30. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining data characterizing a source computing environment having at least one hardware resource and at least one workload;
   obtaining a specification of a target computing environment to which said at least one workload is to be migrated in a migration;
   based on said data characterizing said source computing environment and said specification of said target computing environment, categorizing said migration into one of a plurality of categories; and
   specifying said migration in accordance with a migration technique selected based on said categorizing step,
   wherein said categorizing of said migration comprises:
   determining whether an operating system version upgrade is required;
   determining whether at least one of a middleware upgrade and an application upgrade is required;
   determining whether an internet protocol address change is required,
   categorizing said migration into a first category if said operating system version upgrade is not required, said at least one of a middleware upgrade and an application upgrade is not required, and said internet protocol address change is not required;
   categorizing said migration into a second category if said operating system version upgrade is not required, said at least one of a middleware upgrade and an application upgrade is not required, and said internet protocol address change is required;
   if said operating system version upgrade is not required, and said at least one of a middleware upgrade and an application upgrade is required, determining whether a new server build is required;
   if said operating system version upgrade is not required, and said at least one of a middleware upgrade and an application upgrade is required, and said new server build is not required, categorizing said migration into a third category; and
   if at least one of:
      said operating system version upgrade is not required, and said at least one of a middleware upgrade and an application upgrade is required, and said new server build is required; and
      said operating system version upgrade is required;
   categorizing said migration into a fourth category.

2. The method of claim 1, further comprising carrying out said migration in accordance with said selected migration technique.

3. The method of claim 2, wherein, in said step of obtaining said specification of said target computing environment, said target computing environment comprises a virtualized server environment, and wherein said step of carrying out said migration comprises migrating said workloads to said virtualized server environment.

4. The method of claim 2, wherein, in said step of obtaining said specification of said target computing environment, said target computing environment comprises a cloud computing environment, and wherein said step of carrying out said migration comprises migrating said workloads to said cloud computing environment.

5. The method of claim 1, wherein said specifying comprises specifying said migration as a provisioning approach which drives a sequence of provisioning steps, said provisioning approach in turn being dictated by a plurality of rules based on said data characterizing said source computing environment, said specification of said target computing environment, and a database comprising rules specifications.

6. An article of manufacture comprising a computer program product, said computer program product comprising:
   a non-transitory computer readable storage medium storing computer readable program code, the computer readable program code comprising:
      computer readable program code configured to obtain data characterizing a source computing environment having at least one hardware resource and at least one workload;
      computer readable program code configured to obtain a specification of a target computing environment to which said at least one workload is to be migrated in a migration;
      computer readable program code configured to, based on said data characterizing said source computing environment and said specification of said target computing environment, categorize said migration into one of a plurality of categories; and
      computer readable program code configured to specify said migration in accordance with a migration technique selected based on said categorizing step,
   wherein said computer readable program code configured to categorize said migration comprises:
      computer readable program code configured to determine whether an operating system version upgrade is required,
      computer readable program code configured to determine whether at least one of a middleware upgrade and an application upgrade is required,
      computer readable program code configured to determine whether an internet protocol address change is required,
      computer readable program code configured to categorize said migration into a first category if said operating system version upgrade is not required, said at least one of a middleware upgrade and an application upgrade is not required, and said internet protocol address change is not required;
      computer readable program code configured to categorize said migration into a second category if said operating system version upgrade is not required, said at least one of a middleware upgrade and an application upgrade is not required, and said internet protocol address change is required;

computer readable program code configured to, if said operating system version upgrade is not required, and said at least one of a middleware upgrade and an application upgrade is required, determine whether a new server build is required;

computer readable program code configured to, if said operating system version upgrade is not required, and said at least one of a middleware upgrade and an application upgrade is required, and said new server build is not required, categorize said migration into a third category; and computer readable program code configured to, if at least one of:

said operating system version upgrade is not required, and said at least one of a middleware upgrade and an application upgrade is required, and said new server build is required; and said operating system version upgrade is required;

categorize said migration into a fourth category.

7. The article of manufacture of claim 6, further comprising computer readable program code configured to carry out said migration in accordance with said selected migration technique.

8. The article of manufacture of claim 7, wherein said target computing environment comprises a virtualized server environment, and wherein said computer readable program code configured to carry out said migration comprises computer readable program code configured to migrate said workloads to said virtualized server environment.

9. The article of manufacture of claim 7, wherein said target computing environment comprises a cloud computing environment, and wherein said computer readable program code configured to carry out said migration comprises computer readable program code configured to migrate said workloads to said cloud computing environment.

10. The article of manufacture of claim 6, wherein said computer readable program code configured to specify comprises computer readable program code configured to specify said migration as a provisioning approach which drives a sequence of provisioning steps, said provisioning approach in turn being dictated by a plurality of rules based on said data characterizing said source computing environment, said specification of said target computing environment, and a database comprising rules specifications.

* * * * *